United States Patent
Ribbich et al.

(10) Patent No.: US 11,441,799 B2
(45) Date of Patent: Sep. 13, 2022

(54) THERMOSTAT WITH INTERACTIVE INSTALLATION FEATURES

(71) Applicant: Johnson Controls Technology Company, Auburn Hills, MI (US)

(72) Inventors: Joseph R. Ribbich, Waukesha, WI (US); Nicholas S. Van Derven, Wauwatosa, WI (US); William P. Alberth, Jr., Prairie Grove, IL (US); Alan S. Schwegler, Shorewood, WI (US); Corey A. Poquette, Milwaukee, WI (US); Michael J. Ajax, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 44 days.

(21) Appl. No.: 16/601,251

(22) Filed: Oct. 14, 2019

(65) Prior Publication Data
US 2020/0041154 A1    Feb. 6, 2020

Related U.S. Application Data

(63) Continuation of application No. 15/473,142, filed on Mar. 29, 2017, now Pat. No. 10,458,669.

(51) Int. Cl.
*F24F 11/30*    (2018.01)
*G05B 15/02*    (2006.01)
(Continued)

(52) U.S. Cl.
CPC .............. *F24F 11/30* (2018.01); *F24F 11/49* (2018.01); *F24F 11/52* (2018.01); *F24F 11/89* (2018.01);
(Continued)

(58) Field of Classification Search
CPC .. F24F 11/30; F24F 11/49; F24F 11/52; F24F 11/56; F24F 11/64; F24F 11/89; F24F 2110/10; G05B 15/02; G05D 23/1902
See application file for complete search history.

(56) References Cited

U.S. PATENT DOCUMENTS 5,065,813 A * 11/1991 Berkeley ............ G05D 23/1917
                                                    236/94
5,082,173 A    1/1992 Poehlman et al.
(Continued)

FOREIGN PATENT DOCUMENTS

CA        2466854 C    4/2008
CA        2633200 C    1/2011
(Continued)

OTHER PUBLICATIONS

U.S. Appl. No. 15/146,202, filed May 4, 2016, Johnson Controls Technology Company.
(Continued)

*Primary Examiner* — Kidest Bahta
(74) *Attorney, Agent, or Firm* — Foley & Lardner LLP

(57) ABSTRACT

A building system comprising one or more memory devices storing instructions that, are executed by one or more processors. The instructions include retrieving one or more instructions for installing a thermostat with heating, ventilation, and air conditioning (HVAC) equipment and causing a user interface to display the one or more instructions. The instructions further include receiving one or more confirmation indications of the one or more instructions being performed successfully by a user and causing the user interface to display an interface including one or more indication that the one or more instructions were performed successfully by the user.

20 Claims, 7 Drawing Sheets

(51) Int. Cl.
  *F24F 11/89* (2018.01)
  *F24F 11/52* (2018.01)
  *G05D 23/19* (2006.01)
  *F24F 11/49* (2018.01)
  *F24F 11/56* (2018.01)
  *F24F 11/64* (2018.01)
  *F24F 110/10* (2018.01)

(52) U.S. Cl.
  CPC ......... *G05B 15/02* (2013.01); *G05D 23/1902* (2013.01); *F24F 11/56* (2018.01); *F24F 11/64* (2018.01); *F24F 2110/10* (2018.01)

(56) References Cited

U.S. PATENT DOCUMENTS

| | | |
|---|---|---|
| 5,161,606 A | 11/1992 | Berkeley et al. |
| 5,232,152 A | 8/1993 | Tsang |
| 5,364,026 A | 11/1994 | Kundert |
| 5,381,950 A | 1/1995 | Aldridge |
| 5,433,377 A | 7/1995 | Sodo et al. |
| 5,482,210 A | 1/1996 | Carey et al. |
| 5,547,107 A | 8/1996 | Boiardi |
| 5,902,183 A | 5/1999 | D'Souza |
| 5,950,709 A | 9/1999 | Krueger et al. |
| 6,119,680 A | 9/2000 | Barritt |
| 6,161,764 A | 12/2000 | Jatnieks |
| 6,164,374 A | 12/2000 | Rhodes et al. |
| 6,169,937 B1 | 1/2001 | Peterson |
| 6,318,639 B1 | 11/2001 | Toth |
| 6,351,693 B1 | 2/2002 | Monie et al. |
| 6,398,118 B1 | 6/2002 | Rosen et al. |
| 6,431,268 B1 | 8/2002 | Rudd |
| 6,435,418 B1 | 8/2002 | Toth et al. |
| 6,467,695 B1 | 10/2002 | Riley et al. |
| 6,514,138 B2 | 2/2003 | Estepp |
| 6,557,771 B2 | 5/2003 | Shah |
| 6,641,054 B2 | 11/2003 | Morey |
| 6,726,112 B1 | 4/2004 | Ho |
| 6,726,113 B2 | 4/2004 | Guo |
| 6,810,307 B1 | 10/2004 | Addy |
| 6,824,069 B2 | 11/2004 | Rosen |
| 6,888,441 B2 | 5/2005 | Carey |
| 6,920,874 B1 | 7/2005 | Siegel |
| 6,935,570 B2 | 8/2005 | Acker, Jr. |
| 6,941,193 B2 | 9/2005 | Frecska et al. |
| 6,988,671 B2 | 1/2006 | Deluca |
| 6,995,518 B2 | 2/2006 | Havlik et al. |
| 7,028,912 B1 | 4/2006 | Rosen |
| 7,044,397 B2 | 5/2006 | Bartlett et al. |
| 7,083,109 B2 | 8/2006 | Pouchak |
| 7,113,086 B2 | 9/2006 | Shorrock |
| 7,140,551 B2 | 11/2006 | de Pauw et al. |
| 7,146,253 B2 | 12/2006 | Hoog et al. |
| 7,152,806 B1 | 12/2006 | Rosen |
| 7,156,317 B1 | 1/2007 | Moore |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,188,002 B2 | 3/2007 | Chapman et al. |
| 7,212,887 B2 | 5/2007 | Shah et al. |
| 7,222,494 B2 | 5/2007 | Peterson et al. |
| 7,226,496 B2 | 6/2007 | Ehlers |
| 7,232,075 B1 | 6/2007 | Rosen |
| 7,261,243 B2 | 8/2007 | Butler et al. |
| 7,274,972 B2 | 9/2007 | Amundson et al. |
| 7,287,709 B2 | 10/2007 | Proffitt et al. |
| 7,296,426 B2 | 11/2007 | Butler et al. |
| 7,299,996 B2 | 11/2007 | Garrett et al. |
| 7,306,165 B2 | 12/2007 | Shah |
| 7,308,384 B2 | 12/2007 | Shah et al. |
| 7,317,970 B2 | 1/2008 | Pienta et al. |
| 7,320,110 B2 | 1/2008 | Shah |
| 7,325,748 B2 | 2/2008 | Acker, Jr. |
| 7,331,187 B2 | 2/2008 | Kates |
| 7,343,751 B2 | 3/2008 | Kates |
| 7,402,780 B2 | 7/2008 | Mueller et al. |
| 7,434,413 B2 | 10/2008 | Wruck |
| 7,434,744 B2 | 10/2008 | Garozzo et al. |
| 7,475,558 B2 | 1/2009 | Perry |
| 7,475,828 B2 | 1/2009 | Bartlett et al. |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,614,567 B2 | 11/2009 | Chapman et al. |
| 7,624,397 B1 | 11/2009 | Washburn et al. |
| 7,624,931 B2 | 12/2009 | Chapman et al. |
| 7,633,743 B2 | 12/2009 | Barton et al. |
| 7,636,604 B2 | 12/2009 | Bergman et al. |
| 7,638,739 B2 | 12/2009 | Rhodes et al. |
| 7,641,126 B2 | 1/2010 | Schultz et al. |
| 7,645,158 B2 | 1/2010 | Mulhouse et al. |
| 7,667,163 B2 | 2/2010 | Ashworth et al. |
| 7,726,581 B2 | 6/2010 | Naujok et al. |
| 7,731,096 B2 | 6/2010 | Lorenz et al. |
| 7,731,098 B2 | 6/2010 | Butler et al. |
| 7,740,184 B2 | 6/2010 | Schnell et al. |
| 7,748,225 B2 | 7/2010 | Butler et al. |
| 7,748,639 B2 | 7/2010 | Perry |
| 7,748,640 B2 | 7/2010 | Roher et al. |
| 7,755,220 B2 | 7/2010 | Sorg et al. |
| 7,758,408 B2 | 7/2010 | Hagentoft |
| 7,765,826 B2 | 8/2010 | Nichols |
| 7,784,291 B2 | 8/2010 | Butler et al. |
| 7,784,704 B2 | 8/2010 | Harter |
| 7,788,936 B2 | 9/2010 | Peterson et al. |
| 7,793,510 B2 | 9/2010 | Perry et al. |
| 7,798,418 B1 | 9/2010 | Rudd |
| 7,802,618 B2 | 9/2010 | Simon et al. |
| 7,832,652 B2 | 11/2010 | Barton et al. |
| 7,845,576 B2 | 12/2010 | Siddaramanna et al. |
| 7,861,941 B2 | 1/2011 | Schultz et al. |
| 7,867,646 B2 | 1/2011 | Rhodes |
| 7,908,116 B2 | 3/2011 | Steinberg et al. |
| 7,908,117 B2 | 3/2011 | Steinberg et al. |
| 7,918,406 B2 | 4/2011 | Rosen |
| 7,938,336 B2 | 5/2011 | Rhodes et al. |
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 8,010,237 B2 | 8/2011 | Cheung et al. |
| 8,032,254 B2 | 10/2011 | Amundson et al. |
| 8,082,065 B2 | 12/2011 | Imes et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,091,796 B2 | 1/2012 | Amundson et al. |
| 8,099,195 B2 | 1/2012 | Imes et al. |
| 8,100,746 B2 | 1/2012 | Heidel et al. |
| 8,108,076 B2 | 1/2012 | Imes et al. |
| 8,131,506 B2 | 3/2012 | Steinberg et al. |
| 8,141,373 B2 | 3/2012 | Peterson et al. |
| 8,141,791 B2 | 3/2012 | Rosen |
| 8,165,721 B2 | 4/2012 | Petit |
| 8,167,216 B2 | 5/2012 | Schultz et al. |
| 8,180,492 B2 | 5/2012 | Steinberg |
| 8,185,244 B2 | 5/2012 | Wolfson |
| 8,190,296 B2 | 5/2012 | Alhilo |
| 8,190,367 B2 | 5/2012 | Bassa |
| 8,195,313 B1 | 6/2012 | Fadell et al. |
| 8,196,185 B2 | 6/2012 | Geadelmann et al. |
| 8,209,059 B2 | 6/2012 | Stockton |
| 8,214,085 B2 | 7/2012 | Boudreau et al. |
| 8,219,249 B2 | 7/2012 | Harrod et al. |
| 8,239,066 B2 | 8/2012 | Jennings et al. |
| 8,276,829 B2 | 10/2012 | Stoner et al. |
| 8,280,536 B1 | 10/2012 | Fadell et al. |
| 8,289,182 B2 | 10/2012 | Vogel et al. |
| 8,289,226 B2 | 10/2012 | Takach et al. |
| 8,299,919 B2 | 10/2012 | Dayton et al. |
| 8,321,058 B2 | 11/2012 | Zhou et al. |

(56) References Cited

U.S. PATENT DOCUMENTS

| | | |
|---|---|---|
| 8,346,396 B2 | 1/2013 | Amundson et al. |
| 8,387,891 B1 | 3/2013 | Simon et al. |
| 8,393,550 B2 | 3/2013 | Simon et al. |
| 8,412,488 B2 | 4/2013 | Steinberg et al. |
| 8,429,566 B2 | 4/2013 | Koushik et al. |
| 8,463,344 B2 | 6/2013 | Williams |
| 8,473,109 B1 | 6/2013 | Imes et al. |
| 8,476,964 B1 | 7/2013 | Atri |
| 8,489,243 B2 | 7/2013 | Fadell et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,511,578 B2 | 8/2013 | Has |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,523,803 B1 | 9/2013 | Favreau |
| 8,527,096 B2 | 9/2013 | Pavlak et al. |
| 8,532,827 B2 | 9/2013 | Stefanski et al. |
| 8,543,244 B2 | 9/2013 | Keeling et al. |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,640,970 B2 | 2/2014 | Dorendorf |
| 8,644,009 B2 | 2/2014 | Rylski et al. |
| 8,659,302 B1 | 2/2014 | Warren et al. |
| 8,671,702 B1 | 3/2014 | Shotey et al. |
| 8,689,572 B2 | 4/2014 | Evans et al. |
| 8,694,164 B2 | 4/2014 | Grohman et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,757,507 B2 | 6/2014 | Fadell et al. |
| 8,766,194 B2 | 7/2014 | Filson et al. |
| 8,768,521 B2 | 7/2014 | Amundson et al. |
| 8,770,490 B2 | 7/2014 | Drew |
| 8,770,491 B2 | 7/2014 | Warren et al. |
| 8,788,103 B2 | 7/2014 | Warren et al. |
| 8,802,981 B2 | 8/2014 | Wallaert et al. |
| 8,838,282 B1 | 9/2014 | Ratliff et al. |
| 8,843,239 B2 | 9/2014 | Mighdoll et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,874,497 B2 | 10/2014 | Raestik et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,924,026 B2 | 12/2014 | Federspiel et al. |
| 8,939,827 B2 | 1/2015 | Boudreau et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,026,232 B2 | 5/2015 | Fadell et al. |
| 9,033,255 B2 | 5/2015 | Tessier et al. |
| RE45,574 E | 6/2015 | Harter |
| 9,056,539 B2 | 6/2015 | Mirza et al. |
| 9,074,784 B2 | 7/2015 | Sullivan et al. |
| 9,075,419 B2 | 7/2015 | Sloo et al. |
| 9,080,782 B1 | 7/2015 | Sheikh |
| 9,080,784 B2 | 7/2015 | Dean-Hendricks et al. |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,279,595 B2 | 3/2016 | Mighdoll et al. |
| 9,282,590 B2 | 3/2016 | Donlan |
| 9,285,134 B2 | 3/2016 | Bray et al. |
| 9,286,781 B2 | 3/2016 | Filson et al. |
| 9,291,358 B2 | 3/2016 | Federspiel et al. |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,332,322 B2 | 5/2016 | Niemeyer et al. |
| D763,707 S | 8/2016 | Sinha et al. |
| 9,471,069 B2 | 10/2016 | Amundson et al. |
| 9,494,337 B2 | 11/2016 | Ragg |
| 9,506,665 B2 | 11/2016 | Dorendorf et al. |
| 9,506,668 B2 | 11/2016 | Sinur et al. |
| 9,594,384 B2 | 3/2017 | Bergman et al. |
| 9,618,224 B2 | 4/2017 | Emmons et al. |
| 9,638,429 B2 | 5/2017 | O'Hayer |
| 9,671,125 B2 | 6/2017 | Mowris et al. |
| 9,677,772 B2 | 6/2017 | Siegel et al. |
| 9,683,753 B2 | 6/2017 | Lorenz et al. |
| 9,684,317 B2 | 6/2017 | Fadell et al. |
| 9,696,052 B2 | 7/2017 | Malchiondo et al. |
| 9,810,441 B2 | 11/2017 | Dean-Hendricks et al. |
| 2001/0015281 A1 | 8/2001 | Schiedegger et al. |
| 2003/0034897 A1 | 2/2003 | Shamoon et al. |
| 2003/0034898 A1 | 2/2003 | Shamoon et al. |

(56) References Cited

U.S. PATENT DOCUMENTS

| | | |
|---|---|---|
| 2003/0177012 A1 | 9/2003 | Drennan |
| 2004/0041564 A1 | 3/2004 | Brown |
| 2004/0074978 A1 | 4/2004 | Rosen |
| 2004/0262410 A1 | 12/2004 | Hull |
| 2005/0040943 A1 | 2/2005 | Winick |
| 2005/0083168 A1 | 4/2005 | Breitenbach |
| 2005/0194456 A1 | 9/2005 | Tessier et al. |
| 2005/0195757 A1 | 9/2005 | Kidder et al. |
| 2005/0224069 A1 | 10/2005 | Patil et al. |
| 2005/0270151 A1 | 12/2005 | Winick |
| 2006/0004492 A1 | 1/2006 | Terlson et al. |
| 2006/0038025 A1 | 2/2006 | Lee |
| 2006/0113398 A1 | 6/2006 | Ashworth |
| 2006/0192022 A1 | 8/2006 | Barton et al. |
| 2006/0213000 A1 | 9/2006 | Kimble et al. |
| 2006/0260334 A1 | 11/2006 | Carey et al. |
| 2006/0265489 A1 | 11/2006 | Moore |
| 2007/0045431 A1 | 3/2007 | Chapman et al. |
| 2007/0045441 A1 | 3/2007 | Ashworth et al. |
| 2007/0050732 A1 | 3/2007 | Chapman et al. |
| 2007/0057079 A1 | 3/2007 | Stark et al. |
| 2007/0062513 A1 | 3/2007 | Gagas |
| 2007/0114295 A1 | 5/2007 | Jenkins |
| 2007/0198099 A9 | 8/2007 | Shah |
| 2007/0221741 A1 | 9/2007 | Wagner et al. |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2007/0244576 A1 | 10/2007 | Potucek et al. |
| 2007/0264927 A1 | 11/2007 | Choi et al. |
| 2007/0294002 A1 | 12/2007 | Underdal et al. |
| 2008/0011863 A1 | 1/2008 | Roux et al. |
| 2008/0048046 A1 | 2/2008 | Wagner et al. |
| 2008/0054084 A1 | 3/2008 | Olson |
| 2008/0099568 A1 | 5/2008 | Nicodem et al. |
| 2008/0102744 A1 | 5/2008 | Moore et al. |
| 2008/0120446 A1 | 5/2008 | Butler et al. |
| 2008/0161978 A1 | 7/2008 | Shah |
| 2008/0216495 A1 | 9/2008 | Kates |
| 2008/0223051 A1 | 9/2008 | Kates |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0001179 A1 | 1/2009 | Dempsey |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0251422 A1 | 10/2009 | Wu et al. |
| 2009/0276096 A1 | 11/2009 | Proffitt et al. |
| 2010/0070089 A1 | 3/2010 | Harrod et al. |
| 2010/0070092 A1 | 3/2010 | Winter et al. |
| 2010/0084482 A1 | 4/2010 | Kennedy et al. |
| 2010/0107076 A1 | 4/2010 | Grohman et al. |
| 2010/0131884 A1 | 5/2010 | Shah |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0204834 A1 | 8/2010 | Comerford et al. |
| 2010/0212879 A1 | 8/2010 | Schnell et al. |
| 2011/0006887 A1 | 1/2011 | Shaull et al. |
| 2011/0007017 A1 | 1/2011 | Wallaert |
| 2011/0010652 A1 | 1/2011 | Wallaert |
| 2011/0010653 A1 | 1/2011 | Wallaert et al. |
| 2011/0067851 A1 | 3/2011 | Terlson et al. |
| 2011/0088416 A1 | 4/2011 | Koethler |
| 2011/0132991 A1 | 6/2011 | Moody et al. |
| 2011/0181412 A1 | 7/2011 | Alexander et al. |
| 2011/0223850 A1 | 9/2011 | Narayanamurthy et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0013067 A1 | 1/2012 | Thayayil |
| 2012/0023428 A1 | 1/2012 | Kennard et al. |
| 2012/0048955 A1 | 3/2012 | Lin et al. |
| 2012/0061480 A1 | 3/2012 | Deligiannis et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0126020 A1 | 5/2012 | Filson et al. |
| 2012/0126021 A1 | 5/2012 | Warren et al. |
| 2012/0130547 A1 | 5/2012 | Fadell et al. |
| 2012/0131504 A1 | 5/2012 | Fadell et al. |
| 2012/0165993 A1 | 6/2012 | Whitehouse |
| 2012/0181010 A1 | 7/2012 | Schultz et al. |
| 2012/0190294 A1 | 7/2012 | Heidel et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0245740 A1 | 9/2012 | Raestik et al. |
| 2012/0252345 A1 | 10/2012 | Wolfson |
| 2012/0298763 A1 | 11/2012 | Young |
| 2012/0303828 A1 | 11/2012 | Young et al. |
| 2012/0310418 A1 | 12/2012 | Harrod et al. |
| 2013/0002447 A1 | 1/2013 | Vogel et al. |
| 2013/0040550 A1 | 2/2013 | Pfister et al. |
| 2013/0054758 A1 | 2/2013 | Imes et al. |
| 2013/0057381 A1 | 3/2013 | Kandhasamy |
| 2013/0060385 A1 | 3/2013 | Leen et al. |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0099010 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0158716 A1 | 6/2013 | Barton et al. |
| 2013/0180700 A1 | 7/2013 | Aycock |
| 2013/0190932 A1 | 7/2013 | Schuman |
| 2013/0204408 A1 | 8/2013 | Thiruvengada et al. |
| 2013/0204440 A1 | 8/2013 | Fadell et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0221117 A1 | 8/2013 | Warren et al. |
| 2013/0226352 A1 | 8/2013 | Dean-Hendricks et al. |
| 2013/0228633 A1 | 9/2013 | Toth et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268129 A1 | 10/2013 | Fadell et al. |
| 2013/0292481 A1 | 11/2013 | Filson et al. |
| 2013/0297078 A1 | 11/2013 | Kolavennu |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0081466 A1 | 3/2014 | Huapeng et al. |
| 2014/0099872 A1 | 4/2014 | Matsumoto et al. |
| 2014/0112331 A1 | 4/2014 | Rosen |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0130574 A1 | 5/2014 | Happ et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |

(56) References Cited

U.S. PATENT DOCUMENTS

| | | |
|---|---|---|
| 2014/0156087 A1 | 6/2014 | Amundson |
| 2014/0158338 A1 | 6/2014 | Kates |
| 2014/0175181 A1 | 6/2014 | Warren et al. |
| 2014/0188287 A1 | 7/2014 | Sabata |
| 2014/0188288 A1 | 7/2014 | Fisher et al. |
| 2014/0191848 A1 | 7/2014 | Imes et al. |
| 2014/0202449 A1 | 7/2014 | Snyder |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0350733 A1* | 11/2014 | Lorenz ............... F24F 11/30 700/276 |
| 2014/0358295 A1 | 12/2014 | Warren et al. |
| 2014/0367475 A1 | 12/2014 | Fadell et al. |
| 2014/0376530 A1 | 12/2014 | Erickson et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0032264 A1 | 1/2015 | Emmons et al. |
| 2015/0037992 A1 | 2/2015 | Perez, Jr. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0066215 A1 | 3/2015 | Budur |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0088272 A1 | 3/2015 | Drew |
| 2015/0088318 A1 | 3/2015 | Amundson et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144705 A1* | 5/2015 | Thiruvengada ......... F24F 11/30 236/1 C |
| 2015/0144706 A1 | 5/2015 | Robideau et al. |
| 2015/0148963 A1* | 5/2015 | Klein .................... F24F 11/30 700/276 |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159895 A1 | 6/2015 | Quam et al. |
| 2015/0159899 A1 | 6/2015 | Bergman et al. |
| 2015/0159901 A1* | 6/2015 | Quam ................ H04L 12/2818 700/276 |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0280935 A1 | 10/2015 | Poplawski et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0345818 A1 | 12/2015 | Oh et al. |
| 2015/0345819 A1 | 12/2015 | Ostrovsky et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362927 A1 | 12/2015 | Giorgi |
| 2015/0364135 A1 | 12/2015 | Kolavennu et al. |
| 2015/0369503 A1 | 12/2015 | Flaherty et al. |
| 2015/0369507 A1 | 12/2015 | Flaherty et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |

(56) References Cited

U.S. PATENT DOCUMENTS

| | | |
|---|---|---|
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0025366 A1* | 1/2016 | Snow ............ F24F 11/30 700/276 |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0061471 A1 | 3/2016 | Eicher et al. |
| 2016/0061474 A1 | 3/2016 | Cheung et al. |
| 2016/0069580 A1 | 3/2016 | Crisa' |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0116177 A1 | 4/2016 | Sikora et al. |
| 2016/0146769 A1 | 5/2016 | Zhang et al. |
| 2016/0178589 A1 | 6/2016 | Gulaguli et al. |
| 2016/0231014 A1 | 8/2016 | Ro et al. |
| 2016/0327298 A1 | 11/2016 | Sinha et al. |
| 2016/0327302 A1 | 11/2016 | Ribbich et al. |
| 2016/0327921 A1 | 11/2016 | Ribbich et al. |
| 2016/0377298 A1 | 12/2016 | Livchak et al. |
| 2016/0377306 A1 | 12/2016 | Drees et al. |
| 2017/0052545 A1 | 2/2017 | Cortez |
| 2017/0067239 A1 | 3/2017 | Dorendorf et al. |
| 2017/0130981 A1 | 5/2017 | Willette et al. |
| 2017/0136206 A1 | 5/2017 | Pillai et al. |
| 2017/0139386 A1 | 5/2017 | Pillai et al. |
| 2017/0159954 A1 | 6/2017 | Bergman et al. |
| 2017/0176030 A1 | 6/2017 | Emmons et al. |
| 2017/0176963 A1 | 6/2017 | Goli |

FOREIGN PATENT DOCUMENTS

| | | |
|---|---|---|
| CA | 2633121 C | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| DE | 10 2004 005 962 | 8/2005 |
| EP | 2 283 279 A2 | 2/2011 |
| EP | 2 897 018 A1 | 7/2015 |
| EP | 2 988 188 A2 | 2/2016 |
| GB | 2 519 441 A | 4/2015 |
| WO | WO-95/28606 A1 | 10/1995 |
| WO | WO-00/22491 A1 | 4/2000 |
| WO | WO-2006/041599 A9 | 7/2006 |
| WO | WO-2009/006133 A1 | 1/2009 |
| WO | WO-2009/036764 A3 | 3/2009 |
| WO | WO-2009/058127 A1 | 5/2009 |
| WO | WO-2010/059143 A1 | 5/2010 |
| WO | WO-2010/078459 A1 | 7/2010 |
| WO | WO-2010/088663 A1 | 8/2010 |
| WO | WO-2017/031688 | 3/2012 |
| WO | WO-2012/042232 | 4/2012 |
| WO | WO-2012/047938 A2 | 4/2012 |
| WO | WO-2012/068436 A1 | 5/2012 |
| WO | WO-2012/068437 A3 | 5/2012 |
| WO | WO-2012/068459 A3 | 5/2012 |
| WO | WO-2012/068495 A1 | 5/2012 |
| WO | WO-2012/068503 A1 | 5/2012 |
| WO | WO-2012/068507 A3 | 5/2012 |
| WO | WO-2012/068517 A1 | 5/2012 |
| WO | WO-2012/068526 A1 | 5/2012 |
| WO | WO-2012/142477 A3 | 10/2012 |
| WO | WO-2013/033469 A1 | 3/2013 |
| WO | WO-2013/052389 A1 | 4/2013 |
| WO | WO-2013/052901 A3 | 4/2013 |
| WO | WO-2013/052905 A1 | 4/2013 |
| WO | WO-2013/058932 | 4/2013 |
| WO | WO-2013/058933 A1 | 4/2013 |
| WO | WO-2013/058934 | 4/2013 |
| WO | WO-2013/058968 A1 | 4/2013 |
| WO | WO-2013/058969 A1 | 4/2013 |
| WO | WO-2013/059684 A1 | 4/2013 |
| WO | WO-2013/153480 A3 | 10/2013 |
| WO | WO-2014/047501 A1 | 3/2014 |
| WO | WO-2014/051632 A1 | 4/2014 |
| WO | WO-2014/051635 A1 | 4/2014 |
| WO | WO-2014/055059 A1 | 4/2014 |
| WO | WO-2014/152301 A2 | 9/2014 |
| WO | WO-2014/152301 A3 | 9/2014 |
| WO | WO-2015/012449 A1 | 1/2015 |
| WO | WO-2015/039178 A1 | 3/2015 |
| WO | WO-2015/054272 A2 | 4/2015 |
| WO | WO-2015/057698 A1 | 4/2015 |
| WO | WO-2015/099721 A1 | 7/2015 |
| WO | WO-2015/127499 A1 | 9/2015 |
| WO | WO-2015/127566 A1 | 9/2015 |
| WO | WO-2015/134755 A3 | 9/2015 |
| WO | WO-2015/195772 A1 | 12/2015 |
| WO | WO-2016/038374 A1 | 3/2016 |

OTHER PUBLICATIONS

U.S. Appl. No. 15/146,649, filed May 4, 2016, Johnson Controls Technology Company.
U.S. Appl. No. 15/146,749, filed May 4, 2016, Johnson Controls Technology Company.
U.S. Appl. No. 15/247,777, filed Aug. 25, 2016, Johnson Controls Technology Company.
U.S. Appl. No. 15/247,784, filed Aug. 25, 2016, Johnson Controls Technology Company.
U.S. Appl. No. 15/247,788, filed Aug. 25, 2016, Johnson Controls Technology Company.
U.S. Appl. No. 15/247,793, filed Aug. 25, 2016, Johnson Controls Technology Company.
U.S. Appl. No. 15/247,844, filed Aug. 25, 2016, Johnson Controls Technology Company.
U.S. Appl. No. 15/247,869, filed Aug. 25, 2016, Johnson Controls Technology Company.
U.S. Appl. No. 15/247,872, filed Aug. 25, 2016, Johnson Controls Technology Company.
U.S. Appl. No. 15/247,873, filed Aug. 25, 2016, Johnson Controls Technology Company.
U.S. Appl. No. 15/247,875, filed Aug. 25, 2016, Johnson Controls Technology Company.
U.S. Appl. No. 15/247,879, filed Aug. 25, 2016, Johnson Controls Technology Company.
U.S. Appl. No. 15/247,880, filed Aug. 25, 2016, Johnson Controls Technology Company.
U.S. Appl. No. 15/247,883, filed Aug. 25, 2016, Johnson Controls Technology Company.
U.S. Appl. No. 15/247,885, filed Aug. 25, 2016, Johnson Controls Technology Company.
U.S. Appl. No. 15/247,886, filed Aug. 25, 2016, Johnson Controls Technology Company.
U.S. Appl. No. 15/338,215, filed Oct. 28, 2016, Johnson Controls Technology Company.
U.S. Appl. No. 15/338,221, filed Oct. 28, 2016, Johnson Controls Technology Company.
U.S. Appl. No. 29/548,334, filed Dec. 11, 2015, Johnson Controls Technology Company.
U.S. Appl. No. 29/563,447, filed May 4, 2016, Johnson Controls Technology Company.
U.S. Appl. No. 29/576,515, filed Sep. 2, 2016, Johnson Controls Technology Company.

(56) References Cited

OTHER PUBLICATIONS

U.S. Appl. No. 62/239,131, filed Oct. 8, 2015, Johnson Controls Technology Company.
U.S. Appl. No. 62,239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,245, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 8, 2015, Johnson Controls Technology Company.
International Search Report and Written Opinion for Application No. PCT/US2016/030291, dated Sep. 7, 2016, 11 pages.
International Search Report and Written Opinion for Application No. PCT/US2016/030827, dated Sep. 7, 2016, 13 pages.
International Search Report and Written Opinion for Application No. PCT/US2016/030829, dated Sep. 7, 2016, 15 pages.
International Search Report and Written Opinion for Application No. PCT/US2016/030835, dated Sep. 7, 2016, 13 pages.
International Search Report and Written Opinion for Application No. PCT/US2016/030836, dated Sep. 7, 2016, 11 pages.
International Search Report and Written Opinion for Application No. PCT/US2016/030837, dated Sep. 7, 2016, 13 pages.
International Search Report and Written Opinion on PCT/US2018/024833, dated Aug. 31, 2018, 11 pages.
International Search Report and Written Opinion on PCT/US2018/027324, dated Aug. 23, 2018, 6 pages.
Nest, How to Install and Set Up the Nest Learning Thermostat, https://www.youtube.com/watch?v=dHKD-9ul24l, retrieved on Mar. 29, 2017.
Nest, Installing the 3rd Generation Nest Learning Thermostat (Video), https://nest.com/support/article/Installing-the-3rd-generation-Nest-Learning-Thermostat-video, retrieved on Mar. 29, 2017.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.

* cited by examiner

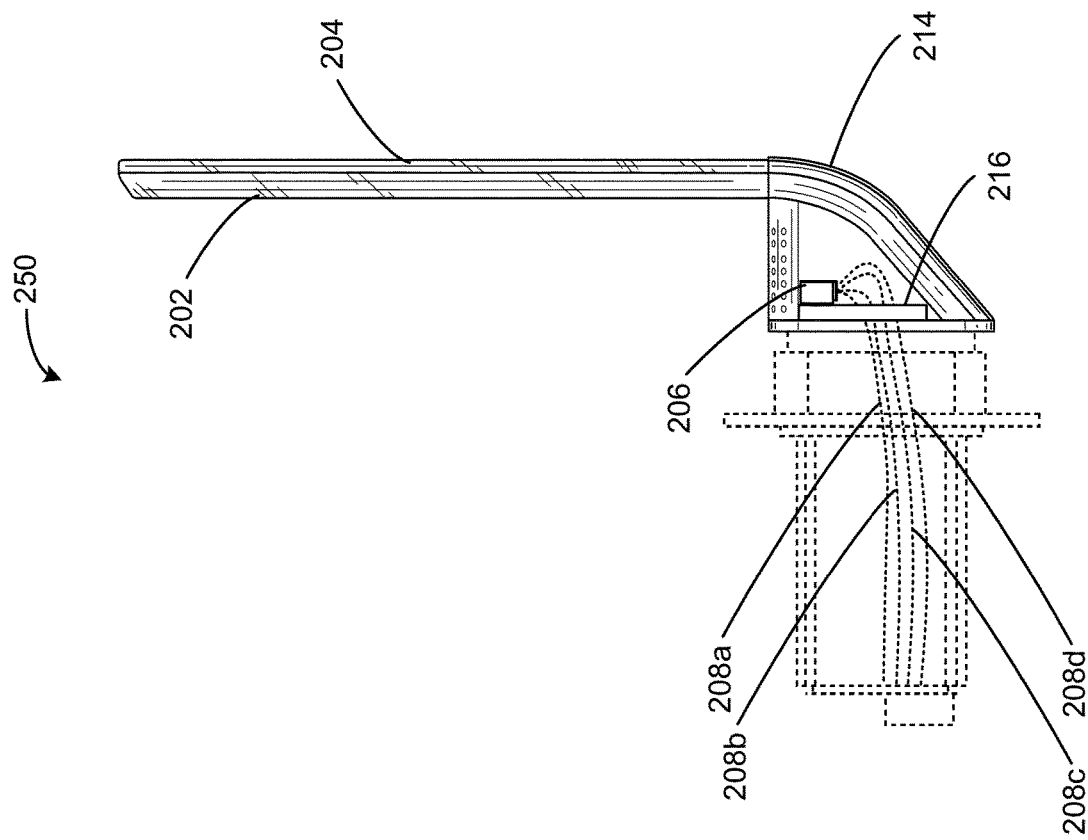
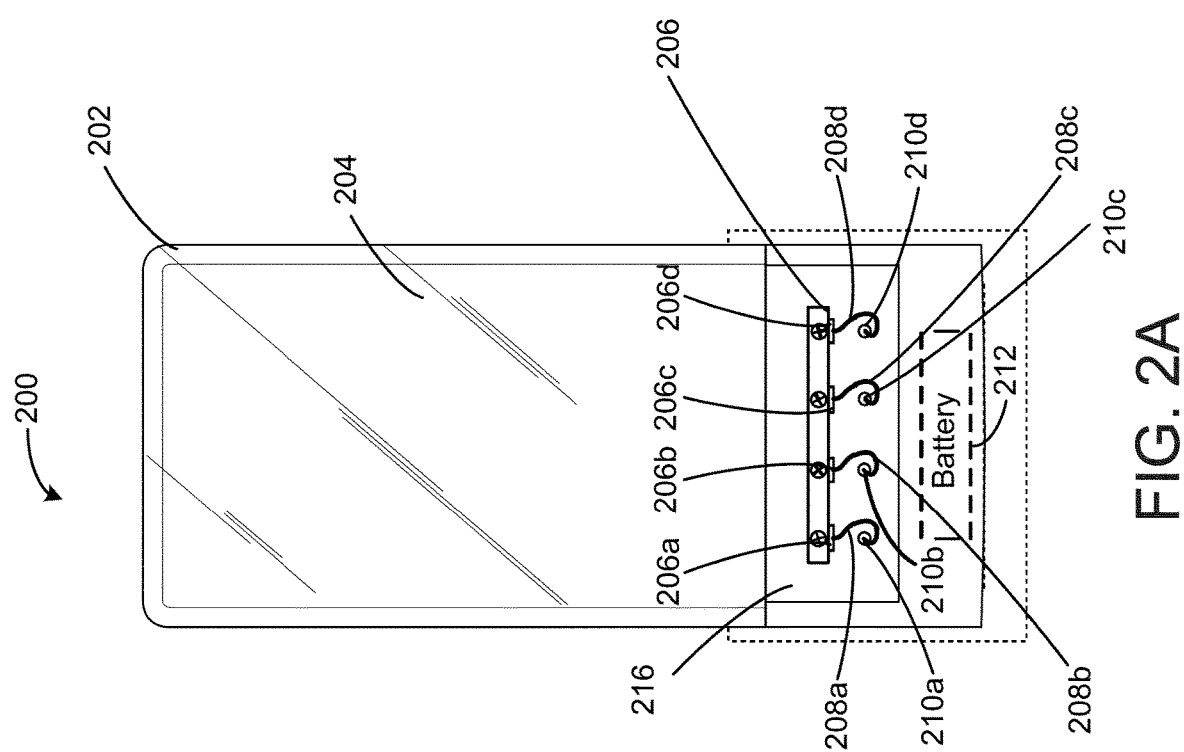
FIG. 2A
FIG. 2B

THERMOSTAT WITH INTERACTIVE INSTALLATION FEATURES

CROSS-REFERENCE TO RELATED PATENT APPLICATIONS

This application is a continuation of U.S. application Ser. No. 15/473,142, filed Mar. 29, 2017, which is incorporated herein by reference in its entirety.

BACKGROUND

Installing a thermostat in a commercial building or a residence often requires an individual to possess knowledge of heating ventilation and air conditioning (HVAC) systems. Some thermostats include several wires which must be properly connected to components of the HVAC system (e.g., sensors, furnace, air conditioning, etc.) in order for the thermostat to monitor and control the building or residence. Connecting these wires properly may require the individual to possess knowledge of the HVAC system as well as knowledge of the specific thermostat being installed. For this reason, installing a thermostat may be difficult and/or time consuming for an individual without knowledge of HVAC systems. The individual may refer to instructional videos on the internet or refer to paper installation manuals to aid in installing the thermostat. However, these installation references require the individual to have technical expertise and presupposes that the individual has the time or the desire to learn about HVAC systems and thermostat installation in order to properly install the thermostat.

SUMMARY

One implementation of the present disclosure is a building system comprising one or more memory devices storing instructions thereon that are executed by one or more processors. The instructions include retrieving one or more instructions for installing a thermostat with heating, ventilation, and air conditioning (HVAC) equipment and causing a user interface to display the one or more instructions. The instructions further include receiving one or more confirmation indications of the one or more instructions being performed successfully by a user and causing the user interface to display an interface including one or more indication that the one or more instructions were performed successfully by the user.

In some embodiments, the instructions for the one or more processors to control the HVAC equipment causes the HVAC equipment to control an environmental condition of a building.

In some embodiments, the thermostat comprises a battery configured to power the thermostat when the thermostat is not connected a permanent power supply wherein the instructions cause the one or more processors to cause the battery to power the thermostat in response to determining that the thermostat is not connected to the permanent power supply.

In some embodiments, the instructions cause the one or more processors to determine the one or more instructions by prompting the user, via the user interface, to capture one or more images of the HVAC equipment via a mobile device. The instructions further cause the cause the one or more processors to determine the one or more instructions by receiving the one or more images from the mobile device, determining identities of the HVAC equipment based on the one or more images, and determining one or more wiring instructions for wiring the thermostat with the HVAC equipment based on the identities of the HVAC equipment.

In some embodiments, the instructions cause the one or more processors to determine one or more wiring instructions by prompting the user, via the user interface, to capture one or more images of the HVAC equipment via a mobile device and send the one or more images to a server via the mobile device. The instructions further cause the one or more processors to determine one or more wiring instructions by receiving identities of the HVAC equipment from the server, the identities of the HVAC equipment determined by the server based on the one or more images and determining the one or more wiring instructions for wiring the thermostat with the HVAC equipment based on the identities of the HVAC equipment.

In some embodiments, the thermostat includes a circuit board, wherein a wiring terminal is connected to the circuit board and the circuit board comprises one or more holes for passing control wires through the circuit board to be connected to the wiring terminal wherein the instructions cause the one or more processors to cause the user interface to display an instruction to mount the thermostat on a wall and pass the control wires through the one or more holes of the circuit board.

In some embodiments, the thermostat includes a detachable cover structured to cover the wiring terminal and the circuit board.

In some embodiments, the instructions cause the one or more processors to determine if control wires have been properly connected to connection points of the thermostat by prompting the user, via the user interface, to capture an image via a mobile device and send the image to the thermostat, wherein the image comprises a view of the control wires connected to a wiring terminal of the thermostat and determining whether each of the control wires is connected to a correct connection point specified by the one or more instructions or whether one or more of the control wires are connected to incorrect connection points.

In some embodiments, determining whether each of the control wires is connected to the correct connection point includes determining an actual wiring configuration based on a color of each control wire and comparing the actual wiring configuration to a correct wiring configuration.

In some embodiments, the instructions cause the one or more processors to determine one or more additional instructions in response to determining that one or more of the control wires are connected to the incorrect connection points and cause the user interface to display the one or more additional instructions, wherein the one or more additional instructions indicate one or more incorrectly connected control wires and the connection points to which the one or more incorrectly connected control wires should be connected.

Another implementation of the present disclosure is a method for installing a thermostat. The method includes retrieving, by one or more processing circuits, one or more instructions for installing the thermostat with building equipment. The method further includes causing, by the one or more processing circuits, a user interface to display the one or more instructions. The method further includes receiving, by the one or more processing circuits, one or more confirmation indications of the one or more instructions being performed successfully by a user and causing, by the one or more processing circuits, the user interface to display an interface including one or more indications that the one or more instructions were performed successfully by the user.

In some embodiments, the one or more instructions include at least one of one or more wiring instructions instructing the user to pass control wires through holes in a circuit board of the thermostat to be connected to a wiring terminal the thermostat, wherein the wiring terminal is connected to the circuit board or one or more installation instructions instructing the user to remove or detach a detachable cover of the thermostat, wherein the detachable cover is structured to cover the wiring terminal and the circuit board.

In some embodiments, the method further includes causing, by the one or more processing circuits, the user interface to display an instruction to mount the thermostat on a wall and pass control wires through one or more holes of a circuit board of the thermostat.

In some embodiments, the method further includes determining, by the one or more processing circuits, whether the thermostat is connected to a permanent power supply and causing, by the one or more processing circuits, a battery of the thermostat to power the thermostat in response to determining that the thermostat is not connected to the permanent power supply.

In some embodiments, the method further includes determining, by the one or more processing circuits, one or more wiring instructions by prompting, by the one or more processing circuits via the user interface, the user to capture one or more images of the building equipment via a mobile device and send the one or more images to the thermostat via the mobile device. The method further includes determining, by the one or more processing circuits, identities of the building equipment based on the one or more images and determining, by the one or more processing circuits, the one or more wiring instructions for wiring the thermostat with the building equipment based on the identities of the building equipment.

In some embodiments, the method further includes determining, by the one or more processing circuits, if control wires have been properly connected to connection points of the thermostat by prompting, by the thermostat via the user interface, the user to capture an image via a mobile device and send the image to the thermostat, wherein the image comprises a view of the control wires connected to a wiring terminal of the thermostat. The method further includes determining, by the thermostat, whether each control wire is connected to a correct connection point for the control wire specified by the one or more installation instructions or whether one or more of the control wires are connected to incorrect connection points.

In some embodiments, the method further includes determining, by the one or more processing circuits, one or more additional instructions in response to determining that one or more of the control wires are connected to the incorrect connection points. The method further includes causing, by the one or more processing circuits, the user interface to display the one or more additional instructions, wherein the one or more additional instructions indicate one or more incorrectly connected control wires and correct connection points of the thermostat to which the one or more incorrectly connected control wires should be connected.

Another implementation of the present disclosure is a thermostat for controlling HVAC equipment via one or more control wires. The thermostat includes a circuit board comprising a wiring terminal, wherein the wiring terminal comprises one or more connection points. The thermostat further includes a user interface configured to display output to a user and receive input from the user. The thermostat further includes a processing circuit configured to retrieve one or more instructions for installing the thermostat with heating, ventilation, and air conditioning (HVAC) equipment and cause the user interface to display the one or more instructions. The processing circuit is further configured to receive one or more confirmation indications of the one or more instructions being performed successfully by the user and cause the user interface to display an interface including one or more indications that the one or more instructions were performed successfully by the user.

In some embodiments, the processing circuit is configured to determine the one or more instructions by identifying the HVAC equipment and determining one or more wiring instructions applicable to the HVAC equipment.

In some embodiments, the processing circuit is configured to determine one or more additional instructions in response to determining that one or more of control wires are connected to incorrect connection points. The processing circuit is further configured to cause the user interface to display the one or more additional instructions, wherein the one or more additional instructions indicate one or more incorrectly connected control wires and correct connection points to which the one or more incorrectly connected control wires should be connected.

BRIEF DESCRIPTION OF THE DRAWINGS

FIG. 2A is a front view of a thermostat with an exposed wiring terminal, according to an exemplary embodiment.

FIG. 2B is a side view of the thermostat of FIG. 2A, according to an exemplary embodiment.

DETAILED DESCRIPTION

Overview

Referring generally to the FIGURES, a thermostat with interactive installation features is shown, according to various exemplary embodiments. The thermostat can be configured to generate and display instructions for a user to install the thermostat with HVAC equipment. When installing a thermostat in a building or home, one or more control wires for building equipment may need to be connected to one or more connection points of a wiring terminal of the thermostat. Conventional thermostats often require the installer to read instruction manuals or internet resources to determine which wires should be connected to which connection point. Advantageously, the thermostat described herein may be configured to generate installation instructions for wiring the thermostat and display the instructions on a user interface of the thermostat so that instruction manuals or separate internet resources are not necessary for installing the thermostat.

In some embodiments, a user provides an input, via a user interface of the thermostat, identifying the current HVAC equipment installed in the building. The thermostat can use the user input to identify the HVAC equipment and generate installation instructions specific to the HVAC equipment installed in the building. In some embodiments, a user captures an image of the HVAC equipment or an image of the wires connected to a previously-installed thermostat (e.g. a thermostat that is being replaced). This captured image can be used by the thermostat to determine the previous wiring configuration and/or to identify the HVAC equipment. The thermostat can be configured to determine installation instructions based on the captured image.

The thermostat may be configured to guide a user through installing the thermostat while the thermostat is installed on a wall but not yet wired. For example, the thermostat may be shipped with a battery which may be pre-installed in the thermostat or inserted into the thermostat prior to connecting the thermostat to the wall. This may allow the thermostat to be powered via the battery before any wires and/or a permanent power supply is connected to the thermostat. The battery power may allow a user to mount the thermostat on a wall and view a screen of the thermostat and installation instructions on the screen before the thermostat is wired. Further, the thermostat can be mounted on a wall with the wiring terminal exposed. For example, the thermostat may include a decorative cover which can be detached to expose a circuit board of the thermostat and a wiring terminal of the circuit board. This allows a user to view instructions on the thermostat while the thermostat is mounted on a wall and simultaneously follow the instructions by making various connections between wires and the connection points.

Building Management System and HVAC System

Figure 1:
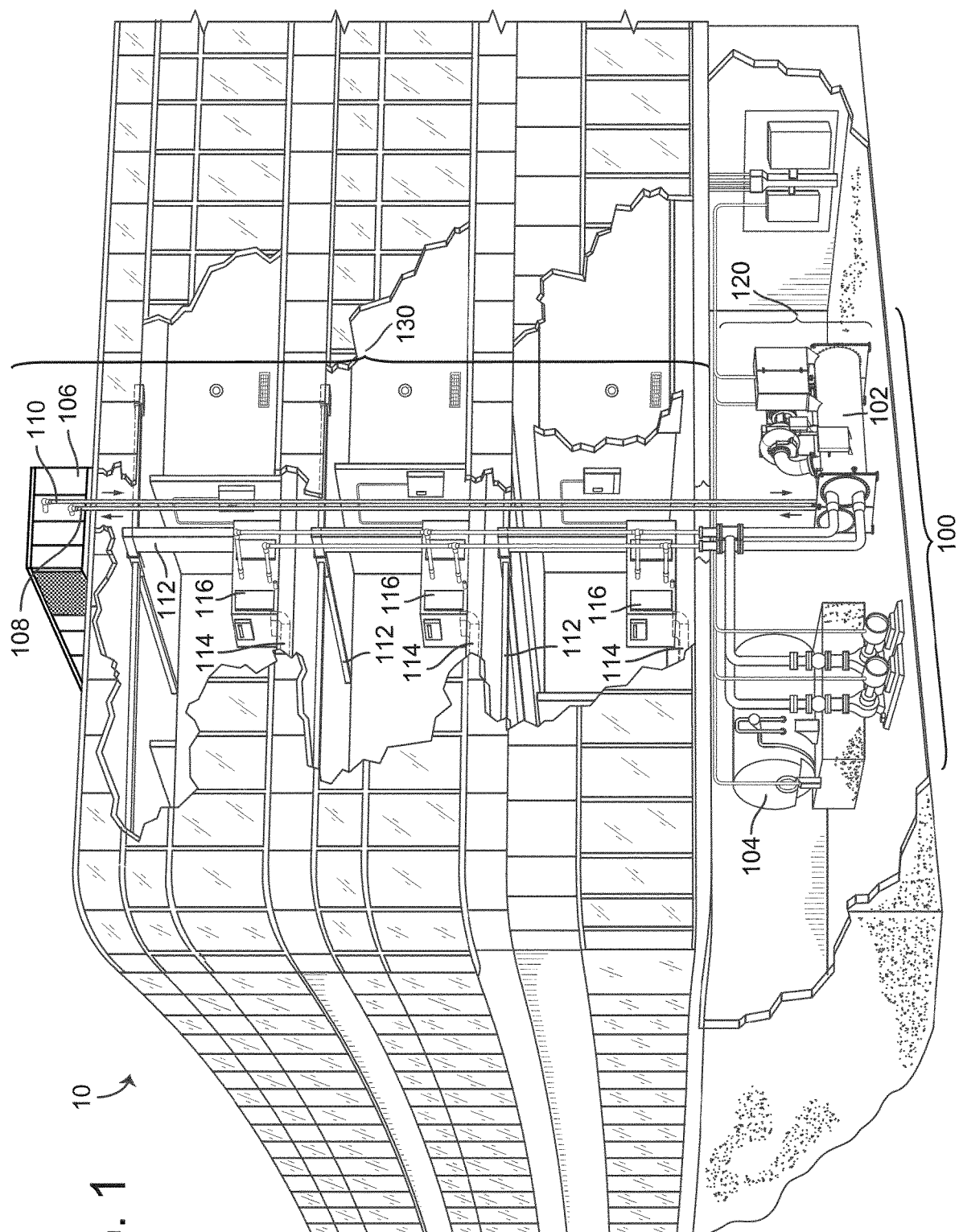
FIG. 1 is a schematic drawing of a building equipped with a HVAC system, according to an exemplary embodiment.

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Thermostat Installation Systems and Methods

Referring now to FIG. 2A, a schematic drawing 200 of a thermostat with an exposed wiring terminal from a front view is shown, according to an exemplary embodiment. In schematic drawing 200, a thermostat 202 is shown. Thermostat 202 is shown to include a user interface 204, a wiring terminal 206, wires 208a-208d, wiring holes 210a-210d, a battery 212, and a circuit board 216. In some embodiments, wiring terminal 206 is coupled to circuit board 216 while holes 210a-210d are holes in circuit board 216. Thermostat 202 is shown to have a cantilevered display. In this regard, thermostat 202 can be mounted on a wall while thermostat 202 is being wired via wires 208a-208d. Various examples of thermostats and thermostats with a cantilevered display can be found in U.S. patent application Ser. No. 15/146,763 filed May 4, 2016, U.S. patent application Ser. No. 15/146,749 filed May 4, 2016, U.S. patent application Ser. No. 15/146,202 filed May 4, 2016, and U.S. patent application Ser. No. 15/146,649 filed May 4, 2016. The entirety of each of these patent applications is incorporated by reference herein.

User interface 204 can be configured to display various installation instructions for installing thermostat 202. These instructions may instruct a user to make various connections between wires 208a-208d and wiring terminal 206. Wires 208a-208d may be wires for various HVAC equipment. In some embodiments, the HVAC equipment is commercial equipment such as chiller 102, boiler 104, AHU 106, etc. In various embodiments, the HVAC equipment is residential equipment such as an indoor unit (e.g., a furnace, a blower, an air handler, etc.) and an outdoor unit (e.g., an air conditioner (AC), a heat pump (HP), etc.). In various embodiments, wires 208a-208d allow thermostat 202 to generate control signals for the various HVAC equipment. In some embodiments, there are four wires, (e.g., 208a, 208b, 208c, and 208d), but in various embodiments, there are any number of wires.

Wires 208a-208d are shown to pass through wiring holes 210a-210d and connect to wiring terminal 206. In various embodiments, wires 208a-208d pass around circuit board 216. Wiring terminal 206 is shown to include connection points 206a-206d. In this regard, wires 208a-208d can be connected to various (e.g., a correct or incorrect) connection points (e.g., connection points 206a-206d). In some embodiments, wiring holes 210a-210d are holes sized (e.g., are a predefined size) for allowing thermostat wires (e.g., wires 208a-208d) to be passed through. In some embodiments, holes 210a-210d are holes in an enclosure and/or a circuit board 216. In this regard, wires 208a-208d may be passed through the enclosure and/or circuit board 216 so that the wires can be connected to terminal 206 while thermostat 202 is positioned upright and/or mounted on a wall. In some embodiments, there may be at least one hole per wire. In some embodiments, there may be fewer holes than wires. In this regard, more than one wire may be passed through one or more of the holes.

Battery 212 may be configured to store and release a charge. In some embodiments, battery 212 can be configured to power thermostat 202. In some embodiments, battery 212 is a rechargeable battery, a one-time use battery, a capacitor, and/or any other energy storing device. Battery 212 may connect to two contact points (e.g., a positive contact and a negative contact) of thermostat 202. The contact points may connect battery 212 to thermostat 202 and allow battery 212 to power thermostat 202. When thermostat 202 is manufactured, a non-conductive spacer may be placed between the battery and the contact point. This may stop battery 212 from discharging before it is purchased and installed. Once the spacer is removed (e.g., when thermostat 202 is being installed), battery 212 may power thermostat 202 and/or thermostat 202 may boot.

Referring now to FIG. 2B, a schematic drawing 250 of thermostat 202 from an exposed left view is shown, according to an exemplary embodiment. In addition to the various components and elements shown in FIG. 2A, thermostat 202 is shown to include a cover 214 over circuit board 216. Cover 214 may be detachable from thermostat 202 and may cover wiring terminal 206 and/or circuit board 216. In various embodiments, cover 214 is structured to slide up and down revealing and/or hiding circuit board 216 and wiring terminal 206. In this regard, a user can remove cover 214 to access wiring terminal 206 and the wires connected to terminal 206 when thermostat 202 is mounted on a wall. Circuit board 216 is shown to be connected to wiring terminal 206 on the front side of circuit board 216. Circuit board 216 may have one or more holes (e.g., 210a-210d) which wires 208a-208d can be passed through. This may allow wires to be passed through circuit board 216 and connected to terminal 206.

Figure 3:
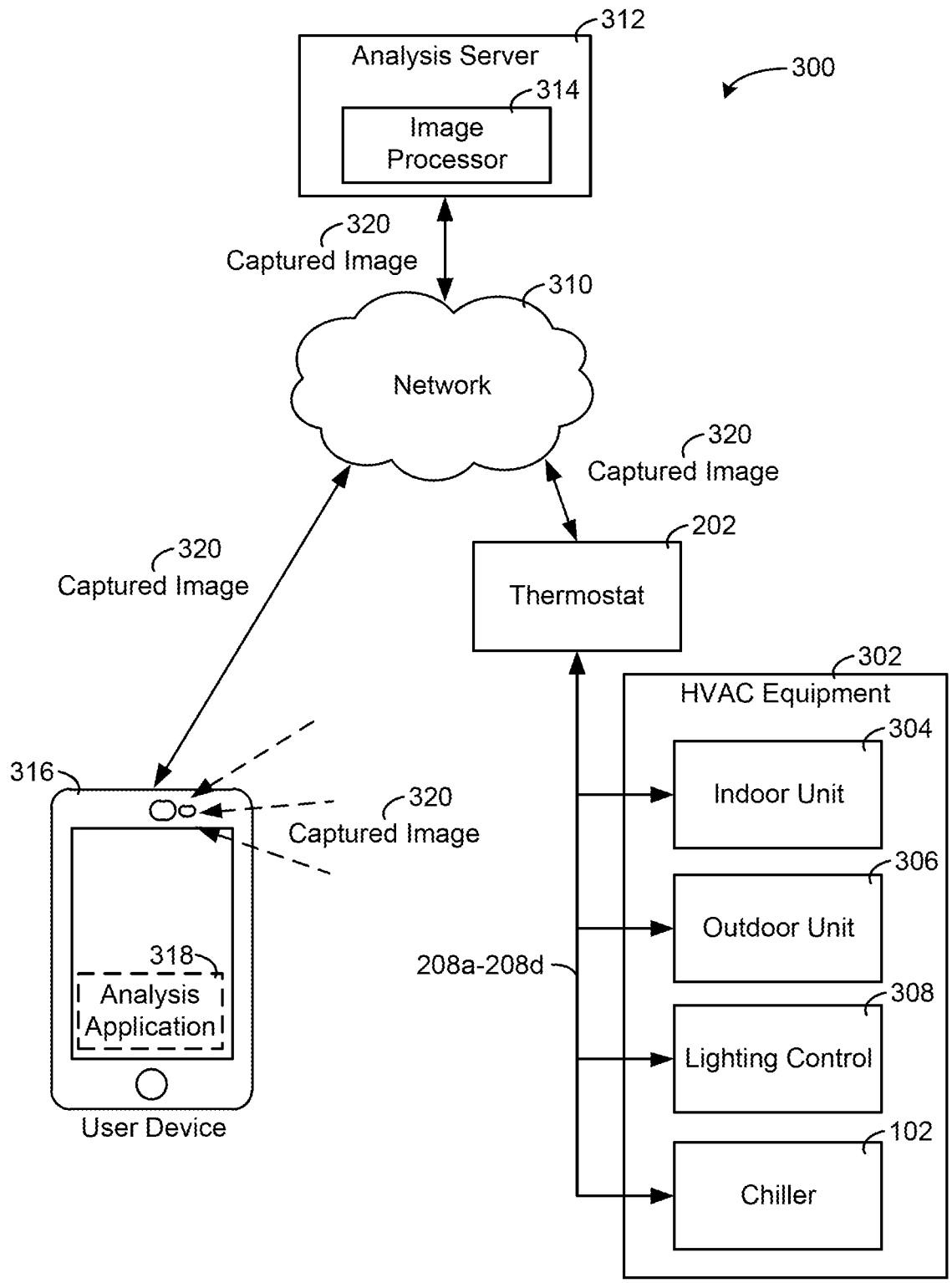
FIG. 3 is a block diagram of a communications system for the thermostat of FIGS. 2A-2B, according to an exemplary embodiment.

Referring now to FIG. 3, a communications system 300 for thermostat 202 is shown, according to an exemplary embodiment. System 300 is shown to include thermostat 202 connected to HVAC equipment 302. HVAC equipment 302 may include one or more pieces of HVAC equipment (e.g., fans, heaters, air conditioners, heat pumps, etc.). System 300 is shown to include thermostat 202, HVAC equipment 302, network 310, analysis server 312, and user device 316. HVAC equipment 302 is shown to include indoor unit 304, outdoor unit 306, lighting control 308, and chiller 102. It should be understood that thermostat 202 can be connected to any kind and/or number of HVAC and/or building equipment and is not limited to the equipment shown in FIG. 3. Thermostat 202 is shown to communicate with HVAC equipment 302 via wires 208a-208d. In some embodiments, thermostat 202 can communicate to indoor unit 304, outdoor unit 306, lighting control 308, and chiller 102 via various forms of communication (e.g., local area network, wireless communication, BACnet, Modbus, CAN, etc.) via wires 208a-208d, and/or any other wiring scheme and/or wireless network and/or wireless hardware (e.g., transmitters, receivers, etc.). Thermostat 202 can be configured to control HVAC equipment 302 via wires 208a-208d to cause an environmental change to occur in a building and/or zone.

Thermostat 202 is shown to be in communication with network 310. In some embodiments, network 310 communicatively couples the devices, systems, and servers of system 300. In some embodiments, network 310 is at least one of and/or a combination of a Wi-Fi network, a wired Ethernet network, a Zigbee network, a Bluetooth network, and/or any other wireless network. Network 310 may be a local area network and/or a wide area network (e.g., the Internet, a building WAN, etc.) and may use a variety of communications protocols (e.g., BACnet, IP, LON, etc.). Network 310 may include routers, modems, and/or network switches. Network 310 may be a combination of wired and wireless networks.

In some embodiments, thermostat 202 can be configured to receive a captured image 320 via network 310. Captured image 320 may be an image of HVAC equipment 302 (e.g., a picture of the equipment, a picture of a scannable tag on the equipment, an identification number on the equipment, etc.) currently installed in the building and/or equipment that an installer may wish to install with thermostat 202. Thermostat 202 can be configured to identify the specific devices HVAC equipment 302 shown in captured image 320 (e.g., device types, device models, etc.). In some embodiments, thermostat 202 receives an indication of the identity of HVAC equipment 302 from analysis server 312. In some embodiments, thermostat 202 receives installation instructions from analysis server 312.

Analysis server 312 can be configured to communicate with thermostat 202 and/or user device 316 via network 310. For example, analysis server 312 can be configured to send captured image 320 to thermostat 202, send installation instructions to thermostat 202, and/or any other information. Further, analysis server 312 can be configured to receive captured image 320 from user device 316. Analysis server 312 can be configured to determine information such as the identities of HVAC equipment 302, determine if the current wiring of wires 208a-208d are correct and/or any other information based on captured image 320. Analysis server 312 is shown to include image processor 314. In some embodiments, image processor 314 is configured to perform various digital image processing techniques to determine information from captured image 320. In some embodiments, image processor 314 includes memory devices, processing circuits, and/or any other device necessary for making various determinations based on captured image 320.

User device 316 can be any smartphone, tablet, laptop, mobile technician device, and/or any other mobile computing device. User device 316 is shown to be communicably coupled to network 310. User device 316 can be configured to send information (e.g., captured image 320) to analysis server 312 and/or thermostat 202 via network 310. In some embodiments, captured image 320 may be captured by a camera and/or any other image capturing device of user device 316. In some embodiments, a user of user device 316 can capture an image of HVAC equipment 302 and/or wiring terminal 206 as described with reference to FIGS. 2A-2B. The image of the HVAC equipment 302 can be used by user device 316, analysis server 312, and/or thermostat 202 to determine the identities of HVAC equipment 302 and determine appropriate installation instructions based on the identities. In some embodiments, the image of wiring terminal 206 can identify the current wiring of wires 208a-208d and with connection points 206a-206d. User device 316, analysis server 312, and/or thermostat 202 can be configured to determine if wires 208a-208d are properly wired in wiring terminal 206 (e.g., connection points 206a-206d).

User device 316 is shown to include analysis application 318. In various embodiments, analysis application 318 is a software application executed on a processor and/or memory device of user device 316. In various embodiments, analysis application 318 includes various processor and/or memory devices. Analysis application 318 can be configured to processor captured image 320. In some embodiments, analysis application 318 can be configured to identify HVAC equipment 302 based on captured image 320, can determine previous wiring of HVAC equipment 302 with a thermostat that is being replaced by thermostat 202, determine if the current wiring configuration between thermostat 202 and HVAC equipment 302 is correct based on captured image 320, etc. Analysis application 328 can be configured to determine installation instructions based on the identified HVAC equipment and/or the previous wiring configuration. Analysis application 318 can be configured to communicate the installation instructions to thermostat 202.

In various embodiments, analysis application 318 determines if thermostat 202 is properly wired with HVAC equipment 302 based on captured image 320. In response to determining that thermostat 202 is not properly wired with HVAC equipment 302, analysis application 318 can be configured to send instructions to correct the wiring to HVAC equipment 302. In response to determining that the wiring is correct, analysis application 318 may be configured to send a message to thermostat 202 indicating that thermostat 202 is properly wired with HVAC equipment 302. In some embodiments, analysis application 318 and/or image processor 314 are components of thermostat 202. Thermostat 202 can be configured to perform the functions of image processor 314 and/or analysis application 318 (e.g., image processing, analysis, etc.) without requiring support from analysis server 312 and/or user device 316.

Figure 4:
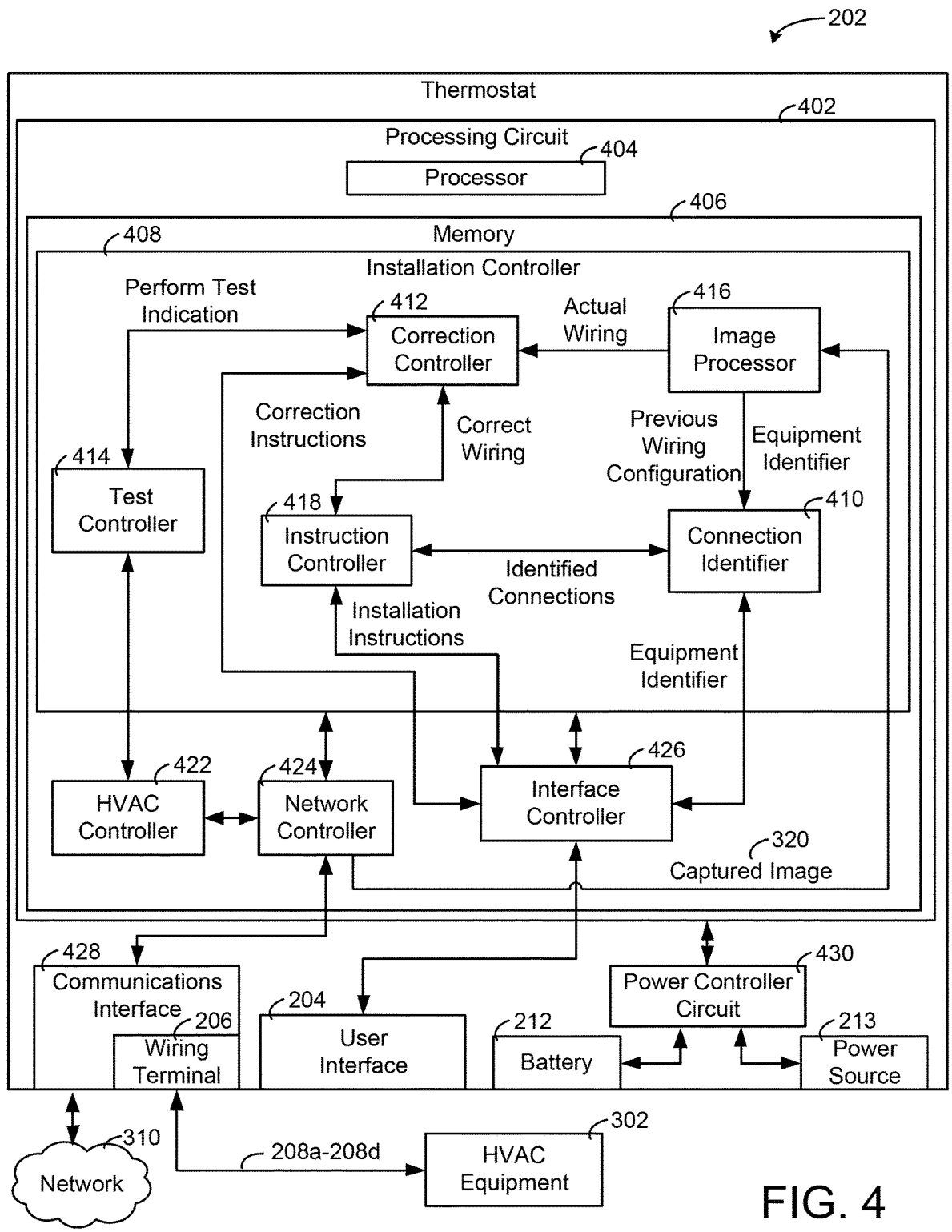
FIG. 4 is a block diagram illustrating the thermostat of FIGS. 2A-3 in greater detail, according to an exemplary embodiment.

Referring now to FIG. 4, thermostat 202 is shown in greater detail, according to an exemplary embodiment. Thermostat 202 is shown to include processing circuit 402 and communications interface 428. Thermostat 202 is shown to include user interface 204 and battery 212 as described with reference to FIGS. 2A-2B. Further, battery 212 is shown to be connected to power controller circuit 430 which is in turn shown to be connected to power source 213. Power source 213 may be a power terminal or interface configured to connect to an external power supply (e.g., AC power). In some embodiments, processing circuit 402, communications interface 428, user interface 204, battery 212, power controller circuit 430, and power source 213 are components of circuit board 216 and/or are otherwise coupled to circuit board 216 as described with reference to FIGS. 2A-2B.

User interface 204 may be a touch screen display configured to receive input from a user and display images and text to a user. In some embodiments, user interface 204 is at least one or a combination of a resistive touch screen and a capacitive touch screen (e.g., projective capacitive touch screen). In some embodiments, user interface 204 is a swept-volume display, a varifocal mirror display, an emissive volume display, a laser display, a holographic display, a light field display, and/or any other display or combination of displays. User interface 204 may be configured to display images and text to a user but may not be configured to receive input from the user. In some embodiments, user interface 204 is one or a combination of a CRT display, an LCD display, an LED display, a plasma display, and/or an OLED display.

In some embodiments, battery 212 stores charge which can be used to power thermostat 202. Battery 212 may be any type or combination of batteries, capacitors (e.g., super capacitors), and/or any other energy storage device. In some embodiments, the battery is a nickel cadmium (Ni—Cd) battery and/or a nickel-metal hydride (Ni-MH) battery. In various embodiments, the battery is a lithium ion battery and/or a lithium polymer battery. In some embodiments, when thermostat 202 is manufactured, battery 212 is shipped with a predefined amount of charge (e.g., 50% charged, 30% charged, etc.). This may allow thermostat 202 to be powered on via battery 212 before thermostat 202 is connected to power source 213 (e.g., a permanent power supply, AC power, etc.). In some embodiments, battery 212 may be an energy harvesting circuit or module.

Power controller circuit 430 can be part of processing circuit 402 and/or partially part of processing circuit 402. Power controller 430 can be configured to power thermostat 202 via battery 212 in response to determining that power source 213 is not connected to power controller circuit 430. In this regard, power controller 430 can be configured to power thermostat 202 via battery 212 without a permanent power source (e.g., power source 213). Further, power controller circuit 430 may include and/or be coupled to a power button. In response to the power button being pressed, power controller circuit 430 can be configured to power thermostat 202 via battery 212 and/or power source 213. In some embodiments, power controller circuit 430 can be configured to power thermostat 202 via power source 213. In some embodiments, power controller circuit 430 can be configured to charge battery 212. Power source 213 may be one or more connections (e.g., wires 208a-208d connected to connection points 206a-206d) which may be connections for a permanent power supply for thermostat 202. In various embodiments, power source 213 may supply AC power and/or DC power to thermostat 202.

Power controller circuit 430 may include a rectifier circuit configured to convert AC power into DC power. In some embodiments, the rectifier is a full wave rectifier, a half wave rectifier, a full bridge rectifier, and any other type of rectifier. In some embodiments, the rectified wave is filtered to smooth out any voltage ripple present after the wave is rectified. Power controller circuit 430 may include various power regulator components, filtering capacitors, and/or any other power circuit and/or electrical component. Power controller circuit 430 may be configured to perform maximum power point tracking (MPPT) when power source 213 is and/or includes a solar cell and/or solar panel. In some embodiments, power controller circuit 430 includes circuits configured to perform slow charge (i.e. trickle charge) and/or fast charge battery 212. In some embodiments, the temperature of battery 212 is monitored while fast charging is performed so that battery 212 does not become damaged.

Communications interface 428 may be configured to communicate with network 310 as described with reference to FIG. 3. Communications interface 428 can be configured to communicate via local area networks (e.g., a building LAN), wide area networks (e.g., the Internet, a cellular network, etc.), conduct direct communications (e.g., NFC, Bluetooth, etc.) ad hoc with devices (e.g., ad hoc Wi-Fi, ad hoc Zigbee, ad hoc Bluetooth, NFC etc.), and/or with ad hoc networks (e.g., MANET, a VANET, a SPAN, an IMANET, and any other ad hoc network). In some embodiments, communications interface 428 facilitates communication with user device 316 and/or analysis server 312. Communications interface 428 can include one or more wireless transceivers (e.g., a Wi-Fi transceiver, a Bluetooth transceiver, a NFC transceiver, a cellular transceiver, etc.) for communicating with mobile devices.

Communications interface 428 is shown to include wiring terminal 206. In this regard, communications interface 428 may also include connection points 206a-206d. Wiring terminal 206 is shown to be connected to HVAC equipment 302 as described with reference to FIG. 3 via wires 208a-208d as described with reference to FIGS. 2A-3. Various components of processing circuit 402 may send control signals for HVAC equipment 302 to communications interface 428. In this regard, the control signals may be sent via wires 208a-208d via the wires connected to wiring terminal 206.

Processing circuit 402 is shown to include a processor 404 and memory 406. Processor 404 can be a general purpose or specific purpose processor, an application specific integrated circuit (ASIC), one or more field programmable gate arrays (FPGAs), a group of processing components, or other suitable processing components. Processor 404 may be configured to execute computer code and/or instructions stored in memory 406 or received from other computer readable media (e.g., CDROM, network storage, a remote server, etc.).

Memory 406 can include one or more devices (e.g., memory units, memory devices, storage devices, etc.) for storing data and/or computer code for completing and/or facilitating the various processes described in the present disclosure. Memory 406 can include random access memory (RAM), read-only memory (ROM), hard drive storage, temporary storage, non-volatile memory, flash memory, optical memory, or any other suitable memory for storing software objects and/or computer instructions. Memory 406 can include database components, object code components, script components, or any other type of information structure for supporting the various activities and information structures described in the present disclosure. Memory 406 can be communicably connected to processor 404 via processing circuit 402 and can include computer code for executing (e.g., by processor 404) one or more processes described herein.

Memory 406 is shown to include installation controller 408, HVAC controller 422, network controller 424, and interface controller 426. HVAC controller 422 can be configured to receive temperature setpoints and humidity setpoints via user interface 204. In some embodiments, HVAC controller 422 can control HVAC equipment 302. In this regard, HVAC controller 422 can be configured to provide control signals to HVAC equipment 302. The control signal may cause HVAC equipment 302 to cool and/or heat a zone and/or building to a setpoint temperature. Further, the control signals may cause HVAC equipment 302 to achieve a humidity value in a building and/or zone based on a humidity setpoint. In some embodiments, HVAC controller 422 can be configured to operate HVAC equipment 302 to perform various system tests for test controller 414.

HVAC controller 422 may use any of a variety of control algorithms (e.g., state-based algorithms, extremum-seeking control algorithms, PID control algorithms, model predictive control algorithms, feedback control algorithms, etc.) to determine appropriate control actions for HVAC equipment 302 connected to thermostat 202 as a function of temperature and/or humidity. For example, if the temperature is above a temperature set point received from user interface 204, HVAC controller 422 may operate an air conditioner to lower the temperature. Similarly, if the temperature is below the temperature set point, HVAC controller 422 may operate a furnace and/or heat-pump to increase the temperature of a zone and/or building. HVAC controller 422 may determine that a humidification or dehumidification component of HVAC equipment 302 should be activated or deactivated to control the ambient humidity to a humidity set point for a building zone.

Network controller 424 may contain instructions to communicate with a network (e.g., network 310) and ad hoc to other devices (e.g., user device 316 and/or analysis server 312). In some embodiments, network controller 424 contains instructions to communicate over wireless and wired communication methods. In some embodiments, wireless communication methods include communicating in a Wi-Fi network, a Zigbee network, and/or a Bluetooth network via communications interface 428. In some embodiments, the communication methods are wired such as via RS-485, Ethernet (e.g., CAT5, CAT5e, etc.), and/or any other wired communication method. Network controller 424 may be configured to facilitate communication via a local area network or a wide area network (e.g., the Internet, a building WAN, etc.) and may be configured to use a variety of communications protocols (e.g., BACnet, IP, LON, etc.). In some embodiments, network controller 424 facilitates ad hoc communication. The ad hoc communication may be at least one of (ad hoc Wi-Fi, ad hoc Zigbee, ad hoc Bluetooth, NFC etc.). In some embodiments, network controller 424 facilitates communication over an ad hoc network (e.g., MANET, a VANET, a SPAN, an IMANET, and any other ad hoc network).

In some embodiments, network controller 424 can allow thermostat 202 to connect and/or login to a network (e.g., network 310). In some embodiments, network controller 242 can allow thermostat 202 to connect to a router and/or other wireless network and/or the Internet. In this regard, network controller 424 may receive a username, a network name, a network, and/or a password from user interface 204 and/or instruction controller 418. In this regard, network controller 424 can connect to network 310 and send and receive data via the network with other devices connected to network 310. In some embodiments, credentials that can be used by network controller 424 to access a service, server, or network include certificates.

Interface controller 426 may be configured to display images on user interface 204. The images can include, for example, maps, text, arrows, symbols, and/or any other image used to display information to a user. In some embodiments, interface controller 426 is configured to receive input from use interface 204. In some embodiments, user interface 204 displays various virtual buttons which a user may interact with. In some embodiments, interface controller 426 receives images and/or text to display on user interface 204 from installation controller 408 and/or any other component of memory 406.

Installation controller 408 can be configured to determine installation instructions for thermostat 202 and cause user interface 204 to display the installation instructions. Installation controller 408 can be configured to determine if a user has properly installed (e.g., wired) HVAC equipment 302 to thermostat 202. Installation controller 408 is shown to include connection identifier 410, correction controller 412, test controller 414, image processor 416, and instruction controller 418.

Connection identifier 410 can be configured to identify connections between thermostat 202 and HVAC equipment 302. Further, connection identifier 410 can be configured to determine the identity of HVAC equipment (e.g., HVAC equipment 302). In some embodiments, connection identifier 410 may store the connection plans and/or installation instructions for various pieces of equipment and/or HVAC systems (e.g., a 2-wire system, a 4-wire system, etc.). In some embodiments, connection identifier 410 includes one or more databases which stores the installation instructions for various HVAC equipment types (e.g., a particular piece of equipment) and/or HVAC systems. In some embodiments, connection identifier 410 can be configured to determine various types of HVAC equipment based on equipment identifiers.

In some embodiments, connection identifier 410 can be configured to store one or more equipment indications (e.g., the name of a piece of equipment) which are linked to various equipment identifiers (e.g., a product name, a serial number, a code, etc.). In this regard, connection identifier 410 can be configured to receive an equipment identifier from image processor 416 and/or user interface 204 via interface controller 426. Also, a user may input an equipment identifier via user interface 204. Connection identifier 410 can be configured to use the equipment identifier to identify the equipment. Further, connection identifier 410 may receive the equipment identifier from image processor 416.

In various embodiments, connection identifier 410 can be configured to cause user interface 204 to present a user with a series of questions regarding a previous wiring configuration. For example, connection identifier 410 may cause user interface 204 to display questions to determine which wires are connected to which wires of a previously installed thermostat, how many wires (e.g., wires 208a-208d) need to be connected to thermostat 202, the color of each wire, etc. Based on this input information, connection identifier 410 can be configured to identify HVAC equipment 302 and/or determine identified connections for installing thermostat 202 with HVAC equipment 302.

In some embodiments, based on the identified equipment, connection identifier 410 can be configured to determine a particular wiring configuration which identities one or more wiring connections. Connection identifier 410 can be configured to store a wiring configuration for each piece of identified equipment. In this regard, connection identifier 410 can be configured to determine one or more identified connections between wires 208a-208d and connection points 206a-206d based on the stored wiring configurations.

For example, a particular building may have Furnace A and Outdoor Unit B as identified by an equipment identifier based on data received from user interface 204 and/or image processor 416. Connection identifier 410 can be configured to determine that a particular indoor unit and a particular outdoor unit, Furnace A and Outdoor Unit B, may make up a 4-wire HVAC system. In this regard, the identified connections for Furnace A and Outdoor Unit B may be for a 4-wire HVAC system. In another example, a particular building may have a Furnace C and no cooling component (e.g., no outdoor unit). In this regard, connection identifier 410 may determine that the building system is a 2-wire system. In another example, a building may include Outdoor Unit D which may be an air conditioner and a heat pump. In this regard, connection identifier 410 can determine that there may be one or more connections between wiring terminal 206 and Outdoor Unit D that are specific to the reversing valve of Outdoor Unit D. Various identified connections between wiring terminal 206 and HVAC equipment 302 may be determined by equipment identifier based on the equipment identified by connection identifier 410. In this regard, connection identifier 410 can communicate the proper identified connections to instruction controller 418.

Instruction controller 418 can be configured to cause user interface 204 to display installation instructions and/or instruction steps. In this regard, instruction controller 418 can be configured to communicate with interface controller 426. Instruction controller 418 can be configured to determine and/or generate installation instructions for installing thermostat 202 with equipment and/or cause user interface 204 to display the installation instructions. In some embodiments, instruction controller 418 can be configured to determine the installation instructions based on the identified connections received from equipment connection identifier 410. In this regard, instruction controller 418 can be configured to generate one or more instructions which may be displayed sequentially on user interface 204. In some embodiments, instruction controller 418 causes user interface 204 to display each instruction and wait until a user has pressed a completion button on user interface 204 before displaying the next instruction. Instruction controller 418 can be configured to determine and/or retrieve various instructions stored on thermostat 202 (e.g., in a database) and/or stored remotely (e.g., on analysis server 312). The stored instructions may be pre-generated instructions that instruction controller 418 can be configured to retrieve. Instruction controller 418 may be configured to determine which instructions to retrieve.

In some embodiments, instruction controller 418 can be configured to determine the total number of steps necessary for guiding the user through installing thermostat 202. In some embodiments, the number of instructions is equal to the number of wires (e.g., wires 208a-208d) that need to be connected between wiring terminal 206 and HVAC equipment 302. In some embodiments, the number of instructions exceeds the number of wires that need to be connected between wiring terminal 206 and HVAC equipment 302. In some embodiments, the instructions include steps which indicate that a user should turn off a specific piece of HVAC equipment 302. In various embodiments, the instructions instruct the user to turn on a specific piece of HVAC equipment 302. The instructions may instruct the user to turn a breaker on and/or off, power cycle a specific piece of equipment (e.g., HVAC equipment 302), mount thermostat 202 on a wall, connect user device 316 with thermostat 202, pass wires 208a-208d through and/or around circuit board 216 (e.g., holes 210a-210d), connect user device 316 to network 310 (e.g., log onto a wireless network), connect thermostat 202 to a network (e.g., login to a router and/or other wireless network), and/or any other step necessary for properly wiring and/or installing thermostat 202 with HVAC equipment 302.

In some embodiments, instruction controller 418 can be configured to monitor the progress of the installation of thermostat 202 with HVAC equipment 302. In this regard, instruction controller 418 may store a counter variable which is incremented and/or decremented whenever a step is performed and/or a user navigates back one or more steps via user interface 204 (e.g., presses a back button). When the counter variable is equal to a predefined amount, instruction controller 418 may determine that the installation has been completed. In some embodiments, instruction controller 418 reboots, operates in a normal operating mode (e.g., a mode other than an installation mode), and/or performs any other operation in response to determining that the installation has been completed. In some embodiments, in response to finishing the installation, instruction controller 418 can cause correction controller 412 to determine if the wires (e.g., wires 208a-208d) between HVAC equipment 302 and wiring terminal 206 have been properly installed.

Correction controller 412 can be configured to determine if the wiring connections between HVAC equipment 302 and wiring terminal 206 are correct. In some embodiments, correction controller 412 provides immediate feedback for each installation step. In other embodiments, correction controller 412 provides wiring feedback after all installation steps have been completed. Correct wiring may be the correct wires (e.g., wires 208a-208d) being properly connected to the correct connection points (e.g., connection points 206a-206d). In this regard, correction controller 412 may cause user interface 204 to display various messages. In some embodiments, the messages include a message to check and/or recheck wiring. In various embodiments, the message prompts the user to take a picture of wiring terminal 206 via user device 316. In some embodiments, the message prompts the user to send the image to analysis server 312 and/or thermostat 202.

Correction controller 412 can be configured to receive an indication of the actual wiring from image processor 416. Further, correction controller 412 can be configured to receive an indication of the correct wiring from instruction controller 418. The actual wiring and the correct wiring may indicate one or more connections between wires 208a-208d and connection points 206a-206d. In this regard, correction controller 412 can be configured to compare the correct wiring to the actual wiring. In response to determining that the correct wiring matches the actual wiring, correction controller 412 can be configured to cause user interface 204 to display a message indicating that the wiring is correct. In various embodiments, in response to determining that the correct wiring matches the actual wiring, correction controller 412 may cause test controller 414 to perform a test on the connected equipment.

In response to determining that the correct wiring does not match the actual wiring, correction controller 412 can cause user interface 204 to display a message to perform one or more steps to correct the wiring. The message may indicate which wires 208a-208d are incorrectly connected and which connection point 206a-206d the incorrectly connected wires need to be changed to. These steps may be additional installation steps which resolve various errors which a user may have made while wiring thermostat 202 with HVAC equipment 302. In this regard, correction controller 412 can be configured to determine the steps necessary for correcting the connections between wires 208a-208d and connection points 206a-206d and cause user interface 204 to display the instructions.

In some embodiments, correction controller 412 can be configured to determine if wires 208a-208d are properly connected to wiring terminal 206 via wire detection. In some embodiments, correction controller 412 can be configured to measure resistance, current, and/or voltage of connection points 206a-206d of wiring terminal 206. In this regard, correction controller 412 may include an analog to digital converter (ADC). Correction controller 412 can be configured to determine if wires 208a-208d are properly connected to connection points 206a-206d. Correction controller 412 may be configured to determine if wires 208a-208d are properly connected to connection points 206a-206d based on the measured resistance, current, and/or voltage. In various embodiments, correction controller 412 receives the correct wiring from instruction controller 418 and/or connection identifier 410. Based on the correct wiring, correction controller 412 can determine an appropriate resistance, voltage, and/or current that should be measured at each of wires connection points 206a-206d. In response to measuring incorrect values at one or more connection points 206a-206d, correction controller 412 can determine that one or more wires are not properly wired. In various embodiments, based on the readings of one or more connection points 206a-206d, correction controller 412 can determine if one or more wires 208a-208d connected to connection points 206a-206d need to be switched with one or more other wires 208a-208d connected to other connection points 206a-206d.

Image processor 416 can be configured to determine information regarding equipment and/or wiring based on images received via communications interface 428. Image processor 416 can be configured to receive images from network 310 and/or user device 316. In some embodiments, image processor 416 can receive captured image 320. In some embodiments, captured image 320 is an image of HVAC equipment 302 and/or an image of identifying information of HVAC equipment 302. In various embodiments, captured image 320 is an image of wiring terminal 206, wires 208a-208d, and connection points 206a-206d.

Image processor 416 can be configured to determine one or more equipment identifiers based on captured image 320. In some embodiments, captured image 320 may be an image of HVAC equipment 302, a picture of a serial number of HVAC equipment 302, and/or any other identifying information. Image processor 416 can be configured to determine the identity of equipment based on captured image 320. In some embodiments, image processor 416 includes a database and/or memory storage device which image processor 416 can be configured to utilize to determine the equipment in captured image 320. Image processor 416 can be configured to perform an internet search via network 310 to identify the equipment depicted in captured image 320 and/or receive information from analysis server 312 that allows image processor 416 to identify the equipment depicted in captured image 320. In response to determining the identity of the equipment depicted in captured image 320, image processor 416 can be configured to send an equipment identifier to equipment connection identifier 410. In some embodiments, the equipment identifier is a serial number, a model number, a name of the equipment, a manufacturer of the equipment, and/or any other identifying information.

Image processor 416 can be configured to determine one or more previous wiring configurations based on captured image 320. In some embodiments, captured image 320 is an image of wires 208a-208d prior to being wired to wiring terminal 206. Image processor 416 can be configured to determine the number of wires in image 320 and/or the color of the wires. Image processor 416 can be configured to use the number of wires and/or the color of the wires to determine the wiring configuration prior to installing thermostat 202 (e.g., the wiring configuration used with a previous thermostat). In some embodiments, image processor 416 can be configured to communicate the previous wiring configuration to equipment connection identifier 410.

Image processor 416 can be configured to determine the actual wiring of wiring terminal 206 based on captured image 320. In some embodiments, captured image 320 is an image of the current wiring of wiring terminal 206 (e.g., connection points 206a-206d) and wires 208a-208d. Image processor 416 can be configured to determine which wires are connected to which connection points. In some embodiments, image processor 416 is configured to determine which wires are connected to which connection points based on the color of the wire. In some embodiments, image processor 416 can be configured to determine if any of the connection points (e.g., connection points 206a-206d) have not been connected to a wire. Image processor 416 can be configured to communicate the actual wiring to correction controller 412 so that correction controller 412 can compare the wiring identified in captured image 320 matches the correct wiring.

Test controller 414 can be configured to perform a test on HVAC equipment 302. The test may include providing control signals to HVAC equipment 302 and monitoring feedback (e.g., sensor readings, responses from HVAC equipment 302, etc.) to determine whether HVAC equipment 302 is properly connected. In some embodiments, test controller 414 can be configured to perform the test in response to correction controller 412 indicating that the correct wiring matches the actual wiring. In some embodiments, test controller 414 causes HVAC controller 422 to operate HVAC equipment 302 in order to perform the test. In some embodiments, test controller 414 monitors ambient temperature of a building and/or zone of a building while HVAC equipment 302 operates. Test controller 414 may cause HVAC controller 422 to heat and/or cool the building. In some embodiments, test controller 414 records a starting temperature before beginning the test and compares the starting temperature and/or humidity to a currently measured temperature and/or humidity. Thermostat 202 may include a temperature sensor and/or a humidity sensors. The temperature sensor can be configured to measure the temperature of a building and/or a zone of the building. Similarly, the humidity sensor can be configured to measure the ambient humidity (e.g., relative humidity) of a zone and/or a building.

Test controller 414 may monitor the ambient temperature and/or humidity and compare the ambient temperature and/or humidity to the recorded ambient temperature and/or humidity to determine if HVAC equipment 302 is operating properly. In some embodiments, test controller 414 includes a time keeping device (e.g., a real time clock, a virtual timer, a hardware timer, etc.). In this regard, test controller 414 can be configured to determine a rate of change of ambient temperature and/or humidity. Test controller 414 can be configured to determine if the rate of change matches and/or exceeds a predefined rate of change and/or falls within a range of predefined rates of change. The predefined rate of change may be based on the heating call, a cooling call, a humidifying call, and/or a dehumidifying call, the ambient temperature, the ambient humidity, and/or specification information regarding HVAC equipment 302. In this regard, test controller 414 can be configured to determine if the HVAC equipment 302 is operating correctly and/or has been properly wired to thermostat 202.

In response to determining that the HVAC equipment 302 has been properly installed, test controller 414 can be configured to cause user interface 204 to display an indication that the thermostat 202 is properly wired with HVAC equipment 302. In response to determining that thermostat 202 is not properly wired with HVAC equipment 302, test controller 414 can be configured to display an indication to check various wiring and/or make wiring corrections.

Referring again to FIGS. 3-4, analysis server 312 and/or analysis application 318 can be configured to perform various functions for guiding a user through installing thermostat 202 and wiring thermostat 202 with HVAC equipment 302. For this reason, the various functions necessary for guiding a user through installing thermostat 202 with HVAC equipment 302 can be performed remotely (e.g., on analysis server 312 and/or user device 316) rather than locally on thermostat 202. For example, thermostat 202 may display a message via user interface 204 prompting a user to take a picture of HVAC equipment via user device 316 and send the picture to analysis server 312. Analysis server 312 can be configured to determine the identities of the HVAC equipment based on the picture received from user device 316 and send the identities to thermostat 202. Thermostat 202 can be configured to determine wiring instructions based on the identities of HVAC equipment 302 received from analysis server 312.

Similarly, thermostat 202 may prompt a user via user interface 204 to capture an image of the wiring between thermostat 202 and HVAC equipment 302 and send the image to analysis server 312. The image may include images of connection points 206a-206d and wires 208a-208d. Based on the color and number of the wires and each wires respective connection to connection points 206a-206d, analysis server 312 can be configured to determine if the wires are properly connected to connection points 206a-206d or are connected to the wrong connection points 206a-206d. Analysis server 312 can send a message to thermostat 202 indicating that the thermostat is properly wired or indicating that the thermostat is not properly wired. Further, analysis server 312 may determine, based on the image, which wires need to be swapped, changed, and/or otherwise altered. Analysis server 312 can send this information to thermostat 202 so that thermostat 202 can display instructions on user interface 204 to adjust the wiring of thermostat 202 with HVAC equipment 302.

In some embodiments, analysis server 312 and/or analysis application 318 performs various image processing functions, instruction generation functions, and equipment test functions in addition to all and/or some of the functions which may be performed by installation controller 408 of thermostat 202. Analysis server 312 and/or analysis application 318 and/or image processor 314 may include one or more processors and one or more memory and/or storage devices. The processors and memory devices of image processor 314 may be similar to processor 404, memory 406, and/or processing circuit 402 as described with reference to FIG. 4.

Image processor 314 can be configured to receive captured image 320 from user device 316 via network 310. Analysis application 318 can be configured to receive captured image 320 from a camera of user device 316. In some embodiments, image processor 314 and/or analysis application 318 can be configured to perform image processing on captured image 320 to determine a previous wiring configured of a thermostat other than thermostat 202 installed with HVAC equipment 302 based on wire color, identify HVAC equipment 302, and can determine if the wiring of thermostat 202 with HVAC equipment 302 is correct or not based on which wire (e.g., wires 208a-208d) are connected to which connection point (e.g., connection points 206a-206d). In some embodiments, image processor 314 and/or analysis application 318 can perform some and/or all of the features of image processor 416 of thermostat 202. In this regard, various data elements such as a previous wiring configuration identifier, an equipment identifier, an actual wiring identifier that can be generated by image processor 416 of thermostat 202 can instead be generated by image processor 314 of analysis server 312 and/or analysis application 318 of user device 316. Further, analysis server 312 and/or analysis application 318 can send the data elements to various components of memory 406 via network 310. In this regard, interface controller 426 of thermostat 202 can receive data from analysis server 312 and/or user device 3169 and/or and send the data to the appropriate component of memory 406 of thermostat 202.

In some embodiments, analysis server 312 and/or analysis application 318 can be configured to perform the various instruction generation features of installation controller 408 of thermostat 202 (e.g., connection identifier 410, instruction controller 418, etc.). Analysis server 312 and/or analysis application 318 can be configured to generate one or more instructions based on captured image 320 and send the instructions to thermostat 202. Thermostat 202 can stream various instructions from analysis server 312 and/or analysis application 318 rather than determining the instructions locally on thermostat 202.

Analysis server 312 and/or analysis application 318 can be further configured to determine if the wiring between thermostat 202 and HVAC equipment 302 is correct. Image processor 314 and/or analysis application 318 can be configured to analyze captured image 320 to determine if wires 208a-208d are properly connected to connection points 206a-206d. In this regard, if analysis server 312 and/or analysis application 318 determines that thermostat 202 is not properly wired to HVAC equipment 302, analysis server 312 and/or analysis application 318 can be configured to send instructions to thermostat 202 which thermostat 202 can display on user interface 204. In some embodiments, the instructions are to change the wiring of one or more wires (e.g., wires 208a-208d).

Figure 5:
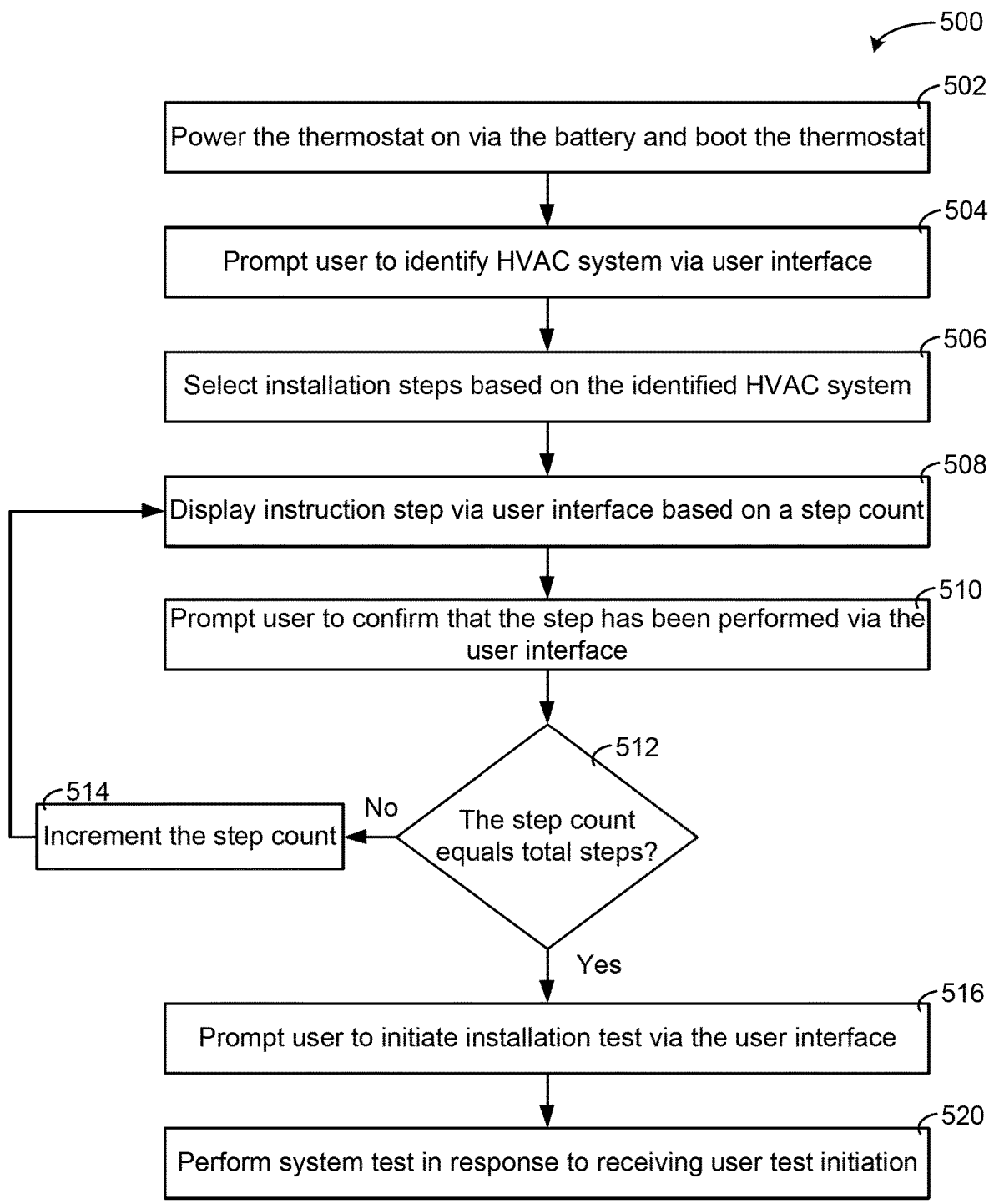
FIG. 5 is a flow diagram of operations for generating and displaying installation instructions on the thermostat of FIGS. 2A-4, according to an exemplary embodiment.

Referring now to FIG. 5, a process 500 for guiding a user through installing a thermostat with HVAC equipment is shown, according to an exemplary embodiment. In some embodiments, thermostat 202 and/or various components of thermostat 202 can be configured to perform process 500. In step 502, thermostat 202 can boot up. In various embodiments, thermostat 202 is powered via battery 212. In some embodiments, thermostat 202 boots up after a non-conductive spacer located between battery 212 and a power connection point of thermostat 202 which may prevents battery 212 from powering thermostat 202 is removed. In various embodiments, thermostat 202 boots after a power button is pressed.

In step 504, instruction controller 418 can cause user interface 204 to prompt a user to identify an HVAC system and/or HVAC equipment which the user may wish to install thermostat 202 with. In some embodiments, instruction controller 418 can be configured to cause user interface 204 to display instructions, a prompt box, and/or may otherwise instruct a user to enter information. In step 506, based on the information identifying the HVAC system and/or HVAC equipment received in step 504, connection identifier 410 and/or instruction controller 418 can determine one or more installation steps. In some embodiments, connection identifier 410 and/or instruction controller 418 can determine the installation instructions based on data stored on thermostat 202 which indicates various wiring instructions for various types of HVAC systems and/or HVAC devices and the identified HVAC systems and/or equipment received in step 504.

In step 508, instruction controller 418 can cause user interface 204 to display installation instructions. The installation instructions may be displayed on user interface 204 sequentially and/or simultaneous. In some embodiments, a value (e.g., step count) may indicate which step of installation should be displayed on user interface 204. For this reason, there may be a relationship between the value of the step count and the instruction displayed on user interface 204. A user may be able to indicate, via user interface 204, that they have performed a particular installation step (step 510).

In step 512, instruction controller 418 can determine if the step count is equal to the total number of steps for installing thermostat 202. If the step count is equal to the total number of steps, thermostat 202 may be installed and process 500 can continue to step 516. If the step count is less than the total number of steps, instruction controller 418 can be configured to increment step count (step 514) and process 500 can continue to step 508 to perform the next installation step. In step 516, instruction controller 418 can cause user interface 204 to display a message indicating that thermostat 202 has been installed and a test should be performed to verifying the installation of thermostat 202. In some embodiments, test controller 414 can test run the equipment that thermostat 202 has been installed with.

In step 520, test controller 414 can perform a system test of HVAC equipment 302 to verify that wires 208a-208d have been properly connected to wiring terminal 206. In this regard, test controller 414 can run HVAC equipment 302 to determine if HVAC equipment 302 is operating correctly and/or if wires 208a-208d have been properly connected to wiring terminal 206. In some embodiments, test controller 414 monitors a temperature rate of change resulting from a heating call, a cooling call, a humidifying call, and/or a dehumidifying call which HVAC controller 422 may cause. Test controller 414 can monitor the temperature rate of change and compare the rate of change to a predetermined rate of change to determine if the HVAC equipment 302 is operating properly and/or wires 208a-208d are properly connected to wiring terminal 206.

Figure 6:
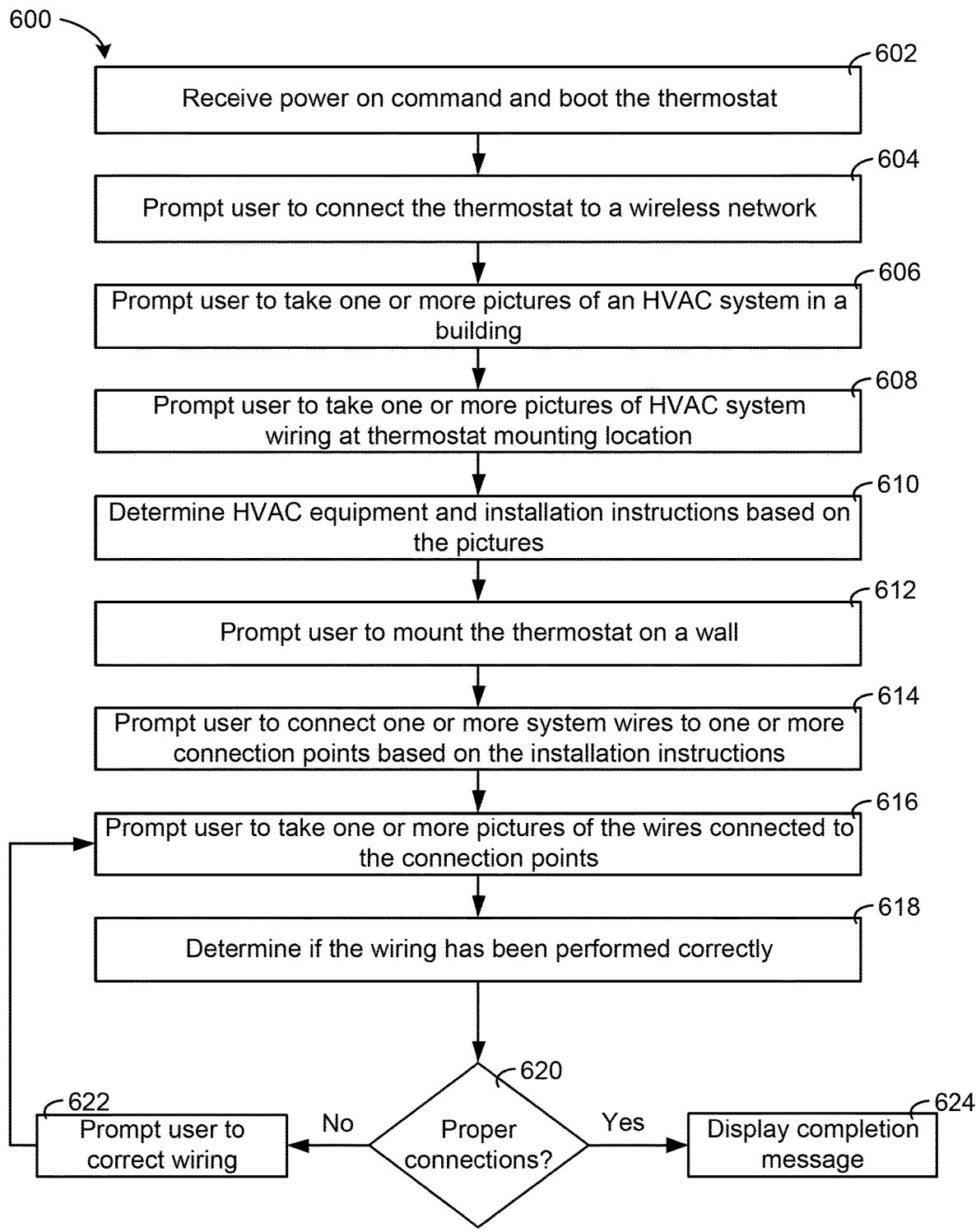
FIG. 6 is a flow diagram of operations for generating installation instructions for the thermostat of FIGS. 2A-4, according to an exemplary embodiment.

Referring now to FIG. 6, a process 600 for guiding, by a thermostat, a user through installing the thermostat with HVAC equipment, according to an exemplary embodiment. In some embodiments, thermostat 202 and the various components of thermostat 202 can be configured to perform process 600 and/or various steps of process 600. In various embodiments, analysis server 312 and/or user device 316 can be configured to perform process 600 and/or various steps of process 600. In step 602, thermostat 202 receives power and boots on. In this some embodiments, thermostat 202 is powered on via battery 212 and/or power controller circuit 430, independent of power source 213 (e.g., without power source 213). This may allow thermostat 202 to be powered on without being wired and/or connected to a permanent power source. In some embodiments, thermostat 202 boots on automatically when a non-conductive spacer is removed from between a power terminal and a contact of the battery. In various embodiments, thermostat 202 boots on when a button is pressed or the button is pressed after the non-conductive spacer is removed.

In step 604, instruction controller 418 can display a message on user interface 204 to prompt the user to connect thermostat 202 to a wireless network (e.g., network 310). In some embodiments, the message prompts a user to enter and/or select a network and/or network name and/or enter a user name and/or password. In some embodiments, the message prompts a user to enter other credentials or certificates. Network controller 424 can be configured to login with a particular router and/or wireless network and be connected to an internal network within a building and/or an external network such as the Internet.

In step 606, instruction controller 418 can causer user interface 204 to display a message instructing a user to take a picture (e.g., captured image 320) of HVAC equipment 302, and/or identifiers of HVAC equipment 302 (e.g., serial numbers and/or other identifiers on various labels and tags of HVAC equipment 302). Captured image 320 may allow thermostat 202 to identify the equipment that a user wishes to install thermostat 202 with. In step 608, instruction controller 418 can prompt a user, via user interface 204 to capture an image (e.g., captured image 320) of HVAC system wiring at the location where thermostat 202 will be installed. The wiring configuration from a previous thermostat with HVAC equipment 302 may be used by thermostat 202 to determine what wiring configuration should be used when installing thermostat 202. In some embodiments, instruction controller 418 prompts the user to send the captured image to thermostat 202.

In step 610, connection identifier 410 can determine the correct wiring for connections for HVAC equipment 302 based on captured image 320. In some embodiments, image processor 416 can perform digital image processing on captured image 320 to determine the identity of HVAC equipment 302 based on captured image 320. In some embodiments, connection identifier 410 can receive an identifier of HVAC equipment 302 via user interface 204. Based on the identified HVAC equipment and/or a previous wiring configuration, connection identifier 410 can determine one or more connections between wires 208a-208d and wiring terminal 206 (e.g., connection points 206a-206d).

In some embodiments, analysis server 312 and/or analysis application 318 as described with further reference to FIG. 3, can process captured image 320, identify HVAC equipment 302, and determine the correct connections between wires 208a-208d. In this regard, installation controller 408 may not process the captured image 320 but rather receives equipment identifiers, previous wiring configurations, actual wiring, wiring corrections, etc. from user device 316 and/or analysis server 312.

In step 612, instruction controller 418 can cause user interface 204 to prompt a user to mount thermostat 202 on a wall. Thermostat 202 may be powered via battery 212 (step 602) and may not yet have any connections between wiring terminal 206 and wires 208a-208d. Thermostat 202 can be powered on and mounted on a wall but not yet have any wires connected to wiring terminal 206.

In step 614, instruction controller 418 can cause user interface 204 to display installation steps. In this regard, instruction controller 418 can receive the identified connections for wires 208a-208d to wiring terminal 206. Based on the various identified connections, instruction controller 418 can sequentially display the instruction steps. This may be performed the same and/or similar to process 500 as described with further reference to FIG. 5. In various embodiments, instruction controller 418 can cause user interface 204 to display all the instructions simultaneously. In some embodiments, a user may indicate that they have performed a certain step and/or steps via user interface 204.

In step 616, instruction controller 418 can cause user interface 204 to display a message prompting a user to capture an image (e.g., captured image 320) via user device 316 of the wiring performed between wires 208a-208d and wiring terminal 206. In some embodiments, image processor 416 of thermostat 202 receives captured image 320 from user device 316. In step 618, image processor 416 can determine if the picture of the wiring between thermostat 202 and HVAC equipment 302 (e.g., wires 208a-208d connected to wiring terminal 206). In some embodiments, image processor 416 can determine the actual wiring based on the color of the wires in captured image 320. Based on the correct wiring received from instruction controller 418, correction controller 412 can compare the actual wiring to the correct wiring to determine if the actual wiring is correct (step 618). Correction controller 412 can determine if the actual wiring does not match the correct wiring and which wires (e.g., wires 208a-208d) are not properly connected to the correct connection point (e.g., connection points 206a-206d) of wiring terminal 206.

In various embodiments, step 618 is performed by user device 316 and/or analysis server 312. In this regard, captured image 320 may be processed remotely on analysis application 318 of user device 316 and/or image processor 314 of analysis server 312. Analysis server 312 may communicate with user device 316 to receive captured image 320 while analysis application 318 of user device 316 may receive captured image 320 from a camera of user device 316. Both analysis application 318 and image processor 314 can process captured image 320 in the same and/or a similar manner as image processor 416 of thermostat 202. Analysis server 312 and/or analysis application 318 can determine the actual wiring based on the color of the wires in captured image 320. Analysis server 312 and/or analysis application 318 can provide the actual wiring to thermostat 202 and/or can determine one or more corrective steps based on the actual wiring and a correct wiring and provide the corrective steps to thermostat 202.

In step 620, correction controller 412 determines to perform step 614 or step 616 based on the determination made regarding the wiring between thermostat 202 and HVAC equipment 302 in step 612. In response to determining that the wires connected to thermostat 202 from HVAC equipment 302 is correct, correction controller 412 may perform step 614. In step 624, correction controller 412 can cause user interface 204 and/or instruction controller 418 can cause user interface 204 to display a message indicating that thermostat 202 has been properly wired to HVAC equipment 302. In some embodiments, in step 614, test controller 414 may perform a test via HVAC controller 422 to determine if the HVAC equipment 302 is properly connected to thermostat 202 by operating HVAC equipment 302.

In response to determining that the wiring between thermostat 202 and HVAC equipment 302 is not correct, correction controller 412 can cause user interface 204 to display a message indicating which wires (e.g., wires 208a-208d) need to be changed to be connected to a different wiring point (e.g., connection points 206a-206d). Process 600 continues to step 616. Correction controller 412 can iteratively perform corrections on wires 208a-208d connected, not connected, and/or not properly connected to wiring terminal 206.

Figure 7:
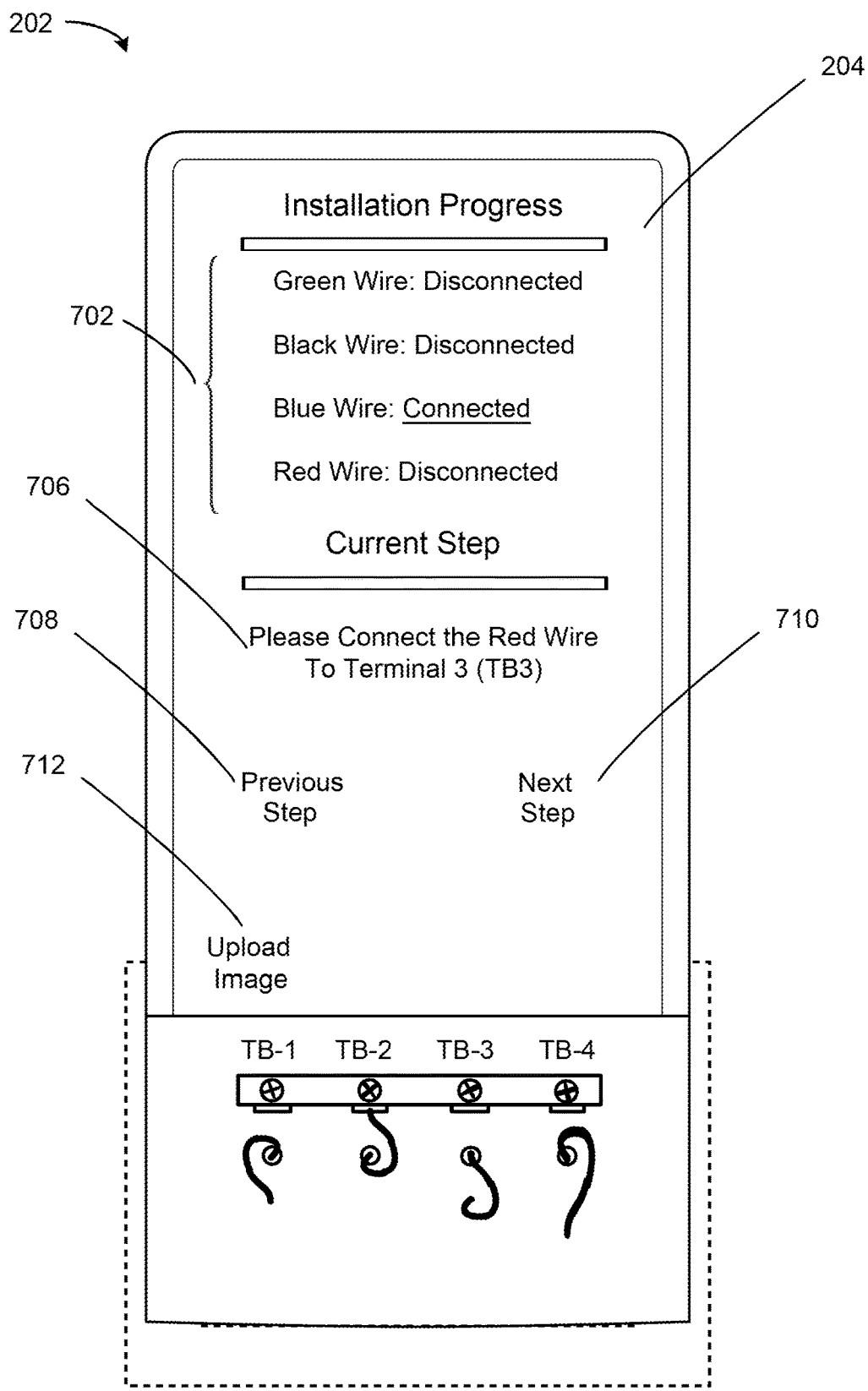
FIG. 7 is a front view of the thermostat of FIGS. 2A-4 displaying installation instructions, according to an exemplary embodiment.

Referring now to FIG. 7, thermostat 202 is shown displaying installation instructions via user interface 204, according to an exemplary embodiment. In FIG. 7, user interface 204 is shown to include installation progress 702. Installation progress 702 shows the status of four wires. These wires may be wires 208a-208d as described with reference to FIGS. 2-3. The wires may be referenced based on their color (e.g., green, black, blue, red, etc.). User interface 204 may display a current step 706. Current step 706 may be an indication to connect a particular wire (e.g., wires 208a-208d) to a particular connection point (e.g., connection points 206a-206d). In FIG. 7, the current step is to connect the red wire to terminal 3. In some embodiments, the red wire may be one of wires 208a-208d while terminal 3 may be one of connection points 206a-206d.

User interface 204 may display step buttons. Previous step 708 may allow a user to go back one step while next step 710 may allow a user to confirm that they have performed the current step and/or to move on to the next step. In some embodiments, pressing previous step 708 and/or next step 710 may increment and/or decrement the step count as described with reference to FIGS. 3-4. The upload image button 712 may allow a user to send an image (e.g., captured image 320) to thermostat 202 via user device 316. Pressing upload image button 712 may cause thermostat 202 to display an image or display that instructs a user to send an image (e.g., captured image 320) to thermostat 202.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat comprising one or more processors and memory storing processor instructions thereon that, when executed by the one or more processors, cause the one or more processors to:
   provide, to a user interface, data comprising a set of installation instructions for installing the thermostat with heating, ventilation, and air conditioning (HVAC) equipment;
   cause the user interface to display a first installation instruction in the set of installation instructions;
   determine that the first installation instruction has been performed successfully by a user; and
   cause the user interface to display that the first installation instruction has been performed successfully by the user.

2. The system of claim 1, wherein other installation instructions in the set of installation instructions are displayed with the first installation instruction and an indication of at least one of the other installation instructions being completed is displayed.

3. The system of claim 1, wherein the thermostat comprises a battery configured to power the thermostat when the thermostat is not connected a permanent power supply;
   wherein the instructions cause the one or more processors to cause the battery to power the thermostat in response to determining that the thermostat is not connected to the permanent power supply.

4. The system of claim 1, wherein the processor instructions cause the one or more processors to determine that the first installation instruction has been performed successfully by a user by:
   prompting the user, via the user interface, to capture one or more images of the HVAC equipment via a mobile device;
   receiving the one or more images from the mobile device;
   determining identities of the HVAC equipment based on the one or more images; and
   determining one or more wiring instructions for wiring the thermostat with the HVAC equipment based on the identities of the HVAC equipment, wherein the first instruction is one of the one or more wiring instructions.

5. The system of claim 1, wherein the processor instructions cause the one or more processors to determine one or more wiring instructions by:
   prompting the user, via the user interface, to capture one or more images of the HVAC equipment via a mobile device and send the one or more images to a server via the mobile device;
   receiving identities of the HVAC equipment from the server, the identities of the HVAC equipment determined by the server based on the one or more images; and
   determining the one or more wiring instructions for wiring the thermostat with the HVAC equipment based on the identities of the HVAC equipment, wherein the first instruction is one of the one or more wiring instructions.

6. The system of claim 1, wherein the thermostat comprises a circuit board, wherein a wiring terminal is connected to the circuit board and the circuit board comprises one or more holes for passing control wires through the circuit board to be connected to the wiring terminal;
   wherein the processor instructions cause the one or more processors to cause the user interface to display an instruction to mount the thermostat on a wall and pass the control wires through the one or more holes of the circuit board.

7. The system of claim 6, further comprising a detachable cover structured to cover the wiring terminal and the circuit board.

8. The system of claim 1, wherein the processor instructions cause the one or more processors to determine if control wires have been properly connected to connection points of the thermostat by:
   prompting the user, via the user interface, to capture an image via a mobile device and send the image to the thermostat, wherein the image comprises a view of the control wires connected to a wiring terminal of the thermostat; and
   determining whether each of the control wires is connected to a correct connection point specified by the one or more installation instructions or whether one or more of the control wires are connected to incorrect connection points, wherein the first instruction is an instruction for one of the control wires.

9. The system of claim 8, wherein determining whether each of the control wires is connected to the correct connection point comprises determining an actual wiring configuration based on a color of each control wire and comparing the actual wiring configuration to a correct wiring configuration.

10. The system of claim 8, wherein the processor instructions cause the one or more processors to:
    determine one or more additional instructions in response to determining that one or more of the control wires are connected to the incorrect connection points; and
    cause the user interface to display the one or more additional instructions, wherein the one or more additional instructions indicate one or more incorrectly connected control wires and the connection points to which the one or more incorrectly connected control wires should be connected.

11. A method for installing a thermostat, the method comprising:
    providing, to a user interface, by one or more processing circuits of the thermostat, one or more instructions for installing the thermostat with building equipment;
    causing, by the one or more processing circuits, the user interface to display a first installation instruction of the one or more instructions;
    automatically determine, by the one or more processing circuits, that the first installation instruction has been instructions being performed successfully by a user; and
    causing, by the one or more processing circuits, the user interface to display an interface including one or more indications that the first installation instruction has been performed successfully by the user.

12. The method of claim 11, wherein the one or more instructions comprise at least one of:
    one or more wiring instructions instructing the user to pass control wires through holes in a circuit board of the thermostat to be connected to a wiring terminal the thermostat, wherein the wiring terminal is connected to the circuit board; or
    one or more installation instructions instructing the user to remove or detach a detachable cover of the thermostat, wherein the detachable cover is structured to cover the wiring terminal and the circuit board.

13. The method of claim 11, further comprising causing, by the one or more processing circuits, the user interface to display an instruction to mount the thermostat on a wall and pass control wires through one or more holes of a circuit board of the thermostat.

14. The method of claim 11, further comprising:
    determining, by the one or more processing circuits, whether the thermostat is connected to a permanent power supply; and
    causing, by the one or more processing circuits, a battery of the thermostat to power the thermostat in response to determining that the thermostat is not connected to the permanent power supply.

15. The method of claim 11, further comprising determining, by the one or more processing circuits, one or more wiring instructions by:
    prompting, by the one or more processing circuits via the user interface, the user to capture one or more images of the building equipment via a mobile device and send the one or more images to the thermostat via the mobile device;
    determining, by the one or more processing circuits, identities of the building equipment based on the one or more images; and
    determining, by the one or more processing circuits, the one or more wiring instructions for wiring the thermostat with the building equipment based on the identities of the building equipment.

16. The method of claim 11, further comprising determining, by the one or more processing circuits, if control wires have been properly connected to connection points of the thermostat by:
    prompting, by the thermostat via the user interface, the user to capture an image via a mobile device and send the image to the thermostat, wherein the image comprises a view of the control wires connected to a wiring terminal of the thermostat; and
    determining, by the thermostat, whether each control wire is connected to a correct connection point for the control wire specified by the one or more installation instructions or whether one or more of the control wires are connected to incorrect connection points.

17. The method of claim 16, further comprising:
determining, by the one or more processing circuits, one or more additional instructions in response to determining that one or more of the control wires are connected to the incorrect connection points; and
causing, by the one or more processing circuits, the user interface to display the one or more additional instructions, wherein the one or more additional instructions indicate one or more incorrectly connected control wires and correct connection points of the thermostat to which the one or more incorrectly connected control wires should be connected.

18. A thermostat for controlling HVAC equipment via one or more control wires, the thermostat comprising:
a circuit board comprising a wiring terminal, wherein the wiring terminal comprises one or more connection points;
a user interface configured to display output to a user and receive input from the user; and
a processing circuit configured to:
provide, to the user interface, one or more instructions for installing the thermostat with heating, ventilation, and air conditioning (HVAC) equipment;
cause the user interface to display the one or more instructions;
automatically determine one or more confirmation indications of the one or more instructions being performed successfully by the user; and
cause the user interface to display an interface including one or more indications that the one or more instructions were performed successfully by the user, wherein the one or more instructions includes a single step related to wiring a single wire of the thermostat and indications includes an indication that the single wire was successfully wired to the thermostat.

19. The thermostat of claim 18, wherein the processing circuit is configured to determine the one or more instructions by:
identifying the HVAC equipment; and
determining one or more wiring instructions applicable to the HVAC equipment.

20. The thermostat of claim 18, wherein the processing circuit is configured to:
determine one or more additional instructions in response to determining that one or more of control wires are connected to incorrect connection points; and
cause the user interface to display the one or more additional instructions, wherein the one or more additional instructions indicate one or more incorrectly connected control wires and correct connection points to which the one or more incorrectly connected control wires should be connected.

* * * * *